(12) United States Patent
Nakanishi et al.

(10) Patent No.: US 7,558,373 B2
(45) Date of Patent: Jul. 7, 2009

(54) X-RAY GENERATOR EMPLOYING HEMIMORPHIC CRYSTAL AND OZONE GENERATOR EMPLOYING IT

(75) Inventors: Yoshikazu Nakanishi, 3-18, Kojyogaoka, Otsu-shi, Shiga 520-0821 (JP); Shinzo Yoshikado, Kyoto (JP); Yoshiaki Ito, Uji (JP); Shinji Fukao, Moriguchi (JP); Sei Fukushima, Hyogo (JP)

(73) Assignees: The Doshisha, Kyoto (JP), part interest; Yoshikazu Nakanishi, Shiga (JP), part interest (*) Notice: Subject to any disclaimer, the term of this patent is extended or adjusted under 35 U.S.C. 154(b) by 241 days.

(21) Appl. No.: 10/593,931

(22) PCT Filed: Sep. 15, 2004

(86) PCT No.: PCT/JP2004/013447

§ 371 (c)(1),
(2), (4) Date: Sep. 21, 2006

(87) PCT Pub. No.: WO2005/101923

PCT Pub. Date: Oct. 27, 2005

(65) Prior Publication Data

US 2007/0165784 A1    Jul. 19, 2007

(30) Foreign Application Priority Data

Mar. 30, 2004 (JP) .............................. 2004-098371
Mar. 30, 2004 (JP) .............................. 2004-099069

(51) Int. Cl.
*G21G 4/06* (2006.01)
*H01J 35/00* (2006.01)

(52) U.S. Cl. ............... 378/119; 378/210; 250/493.1
(58) Field of Classification Search ............... 378/91, 378/119, 143, 210; 250/423 R, 424, 426, 250/427, 493.1; 423/581; 205/626
See application file for complete search history.

(56) References Cited

U.S. PATENT DOCUMENTS

| | | | | |
|---|---|---|---|---|
| 3,840,748 A * | 10/1974 | Braunlich | .................... | 378/122 |
| 4,095,115 A * | 6/1978 | Orr et al. | ................ | 422/186.07 |
| 4,894,852 A * | 1/1990 | Das Gupta | .................. | 378/119 |
| 5,750,011 A * | 5/1998 | Ohmi et al. | ................. | 204/164 |
| 7,266,178 B2 * | 9/2007 | Grodzins | .................... | 378/122 |
| 2003/0009075 A1 * | 1/2003 | Zante | ......................... | 588/227 |
| 2006/0279897 A1 * | 12/2006 | Mizuno et al. | .............. | 361/220 |
| 2008/0156634 A1 * | 7/2008 | Ito et al. | ..................... | 204/176 |

* cited by examiner

*Primary Examiner*—Edward J Glick
*Assistant Examiner*—Anastasia Midkiff
(74) *Attorney, Agent, or Firm*—Kirschstein, et al.

(57) ABSTRACT

An x-ray generator comprising a vessel 1 in which a low pressure gas atmosphere is maintained, hemimorphic crystal supporting means 3a and 3b provided in the vessel, at least a pair of hemimorphic crystals 5a and 5b arranged oppositely at an interval and supported by the hemimorphic crystal supporting means in the vessel, and means 3a, 3b; 6b to 8a and 8b for elevating and lowering the temperature of the hemimorphic crystals. X-rays are radiated from the vessel as the temperature of the hemimorphic crystals is elevated or lowered.

18 Claims, 14 Drawing Sheets

X-RAY GENERATOR EMPLOYING HEMIMORPHIC CRYSTAL AND OZONE GENERATOR EMPLOYING IT

TECHNICAL FIELD

The present invention relates to an x-ray generator employing a hemimorphic crystal, and an ozone generator employing it.

BACKGROUND ART

In general, electron gun x-ray generators have conventionally been known as x-ray sources. In electron gun x-ray generators, most of the energy of electrons that implanted in a target is converted to heat with an efficiency of conversion to x-rays that is extremely low, as low as 0.1%, and so far, it has been an important object to elevate this efficiency of conversion.

X-ray sources employing a hemimorphic crystal have recently attracted attention as a means for achieving this object (see, for example, Non-Patent Document 1). Hemimorphic crystals are also referred to as pyroelectric crystals, and have properties such that when the temperature thereof is elevated and lowered though repeated heating and cooling, spontaneous polarization within the crystal increases or decreases and the charge attracted on the surface fails to follow this change, in such a manner that electrical neutralization is broken. An $LiNbO_3$ single crystal can be cited as a typical hemimorphic crystal, and within this crystal, the center of balance of positive charge ($Li^+$ and $Nb^{5+}$) and the center of balance of negative charge ($O^{2-}$) do not coincide, so that the crystal is polarized in a steady state, where a charge having an equivalent amount to this amount of charge and the opposite sign is attracted to the surface of the crystal, and thereby, the crystal is electrically neutralized under normal circumstances.

FIG. 8 shows the configuration of an example of a conventional x-ray generator employing a hemimorphic crystal. Referring to FIG. 8, a heater/cooler plate 52 is arranged as a support on the bottom within a package 51 that is maintained in a low pressure gas atmosphere, and on the upper surface of this, a hemimorphic crystal 53 is arranged so that the surface thereof having positive electricity is supported in such a manner that the surface having negative electricity, which is upwardly exposed, faces a target 54 made of copper that forms the upper surface of the package 51. A beryllium window 55 which is transparent to x-rays and is air tight is mounted on the upper surface of the target 54. A grounding line 56 is connected to the package 51, which is maintained at the grounding potential, and furthermore, a line 57 for applying a direct current voltage to the heater/cooler plate 52, and a temperature controlling signal line 58 are connected to the package 51 so as to generate a heating cycle for elevating and lowering the temperature starting from room temperature (see, for example, Non-Patent Document 2).

In this conventional x-ray generator, it is assumed that charged particles or electrons which are released from the surface having negative electricity due to a change in the electric field, primarily caused by an increase or decrease in the charge on the surface having negative electricity and the surface having positive electricity at the time when the temperature rises and drops, release and excite gas (particularly, $O_2$ molecules) within the package, and as a result, the ionized electrons are made to collide with the target, and thus, x-rays are excited.

In this configuration, however, a problem arises where the intensity of x-rays that are generated in the unit is low and not inappropriate for practical use, and the x-rays are generated only in a discontinuous manner at the time when the temperature of the hemimorphic crystal rises and drops.

In addition, in the prior art, the following ozone generators have been proposed; an ozone generator employing excitement of a gas including oxygen with ultraviolet rays or a laser, an ozone generator employing high voltage discharge, referred to as silent discharge and the like (see Patent Document 1).

These conventional systems for generating ozone, however, require a power supply unit of a high voltage large power of several hundred thousand volts, and therefore, ozone generators to which these systems are applied need a large installment space and consume a large amount of power, making them inconvenient for use in food stores, restaurants, hotels and kitchens.

Patent Document 1: Japanese Unexamined Patent Publication H8 (1996)-33886
Non-Patent Document 1: Science Magazine "Nature" (volume 358, p. 278, 1992)
Non-Patent Document 2: Commodity Catalogue "AMPTEK X-RAY GENERATOR WITH PYROELECTRIC CRYSTAL COOL-X" by AMPTEK INC., delivered from a homepage on the internet, URL: www.amptek.com

DISCLOSURE OF THE INVENTION

An object of the present invention is to provide an x-ray generator employing a hemimorphic crystal, the x-ray generator being able to generate x-rays of which the intensity is greater than those generated by conventional units, and continuously generate x-rays.

Another object of the present invention is to provide a compact and simple ozone generator which does not use any x-ray tubes or high voltage power supplies, and continuously and effectively utilizes x-rays radiating from a planar surface which are generated through repeated heating and cooling of a hemimorphic crystal.

In order to achieve the above described objects, according to the first invention, there is provided an x-ray generator comprising: a vessel for holding a low pressure gas atmosphere inside; hemimorphic crystal supporting means provided in the vessel; at least a pair of hemimorphic crystals supported by the hemimorphic crystal supporting means in the vessel and arranged oppositely to each other at a distance therebetween; and a heating and cooling means for elevating and lowering the temperature of the hemimorphic crystals, wherein x-rays are radiated from the vessel as the temperature of the hemimorphic crystals is elevated or lowered.

According to a preferred embodiment of the first invention, the walls of the vessel are formed of a material blocking x-rays and provided with at least one x-ray transmission window.

According to another preferred embodiment of the first invention, wherein the hemimorphic crystals of each pair are arranged oppositely to each other at their oppositely charged planes and the heating and cooling means elevates and lowers the temperature of the hemimorphic crystals of each pair with the same temperature gradients and with the same periods.

According to a further preferred embodiment of the first invention, the hemimorphic crystals of each pair are arranged oppositely to each other at their oppositely charged planes and a metal target is arranged between the hemimorphic crystals of each pair and is supported by a target supporting means in the vessel.

According to a further preferred embodiment of the first invention, the hemimorphic crystals of each pair are arranged oppositely to each other at their planes having charge of the same sign and the heating and cooling means elevates and lowers the temperature of the hemimorphic crystals of each pair with the same temperature gradients and with the same periods.

According to a further preferred embodiment of the first invention, the hemimorphic crystals of each pair are arranged oppositely to each other at their planes having charge of the same sign and the heating and cooling means elevates and lowers the temperature of the hemimorphic crystals of each pair with the opposite temperature gradients and with the same periods.

In order to achieve the above described objects, according to the second invention, there is provided an x-ray generator comprising: a vessel for holding a low pressure gas atmosphere inside; hemimorphic crystal supporting means arranged in the vessel; a pair of hemimorphic crystals supported by the hemimorphic crystal supporting means in the vessel and arranged oppositely to each other at a distance therebetween, the pair of hemimorphic crystals being arranged oppositely to each other at their planes having charge of the same sign; a metal target surrounding the space between the pair of hemimorphic crystals in the vessel and supported by a target supporting means arranged in the vessel; and a heating and cooling means for elevating and lowering the temperature of the hemimorphic crystals, wherein x-rays are radiated from the vessel as the temperature of the hemimorphic crystals is elevated or lowered.

According to a preferred embodiment of the second invention, the walls of the vessel are formed of a material that does not transmit x-rays and provided with at least one x-ray transmission window.

According to a preferred embodiment of the first and second invention, wherein the heating and cooling means has: a temperature sensor for measuring the respective temperature of the hemimorphic crystals of each pair; a heating and cooling means for repeatedly heating and cooling the hemimorphic crystals; and a control means for controlling the operation of the heating and cooling means based on a temperature detection signal from the temperature sensor.

In order to achieve the above described objects, according to the third invention, there is provided an x-ray generator comprising: a vessel for holding a low pressure gas atmosphere inside; hemimorphic crystal supporting means arranged in the vessel; a pair of hemimorphic crystal aggregates supported by the hemimorphic crystal supporting means in the vessel and arranged oppositely to each other at a distance therebetween, a heating and cooling means for elevating and lowering the temperature of the hemimorphic crystal aggregates, the pair of hemimorphic crystal aggregates being respectively composed of a number of hemimorphic crystals supported on a base and concavely curved, all of the hemimorphic crystals constituting one of the hemimorphic crystal aggregate facing their positively charged planes toward the side apart from the base, all of the hemimorphic crystals constituting the other of the hemimorphic crystal aggregates facing their negatively charged planes toward the side apart from the base, the pair of hemimorphic crystal aggregates being arranged oppositely to each other at the concave side apart from the base thereof; and a metal target arranged between the pair hemimorphic crystal aggregates and supported by a target supporting means in the vessel.

According to a preferred embodiment of the third invention, the walls of the vessel are formed of a material blocking x-ray transmission and provided with at least one slit-shaped x-ray transmission window positioned in the same plane, and the base has a semi-cylindrical form, and the hemimorphic crystals are arranged on the concave side of the base, and the pair of hemimorphic crystal aggregates are arranged oppositely to each other in the vessel in such a manner that the space between the aggregates in their axial direction matches the slit-shaped x-ray transmission window(s).

In order to achieve the above described objects, according to the fourth invention, there is provided an x-ray generator, comprising: a vessel for holding a low pressure gas atmosphere inside, the vessel being formed of a material blocking x-ray transmission; hemimorphic crystal supporting means arranged in the vessel; a pair of hemimorphic crystal aggregates arranged oppositely and joined to each other through a dielectric material, and supported by the hemimorphic crystal supporting means in the vessel, a heating and cooling means for elevating and lowering the temperature of the hemimorphic crystal aggregates, the pair of hemimorphic crystal aggregates being respectively composed of a number of hemimorphic crystals supported on the concave side of hemispherical shell-shaped bases, all of the hemimorphic crystals constituting one of hemimorphic crystal aggregate facing their positively charged planes toward the side apart from the base, all of the hemimorphic crystals constituting the other of the hemimorphic crystal aggregate facing their negatively charged planes toward the side apart from base, the pair of hemimorphic crystal aggregates being arranged oppositely to each other at the concave side apart from the base thereof and joined to each other through a ring-shaped dielectric material so as to form a spherical shell; and a metal target supported by a target supporting means in the spherical shell at a position including the center of the spherical shell, at least one of the pair of hemimorphic crystal aggregates being provided with at least one through hole, a wall of the vessel being provided with an x-ray transmission window aligning with the through hole.

In order to achieve the above described objects, according to the fifth invention, there is provided an ozone generator, comprising: a low pressure gas sealing housing; a hemimorphic crystal arranged in the housing; a heating and cooling means for repeatedly heating and cooling the hemimorphic crystal arranged in the housing; and a vessel for a material gas for generating ozone, the vessel being arranged adjacently to the outside or inside of the housing, the vessel for a material gas for generating ozone being irradiated with soft x-rays generated from the hemimorphic crystal through an x-ray transmission window.

According to a preferred embodiment of the fifth invention, an x-ray target is arranged in the low pressure gas sealing housing, and soft x-rays and charged particle beams generated from the hemimorphic crystal are projected to the x-ray target, and thereby, the vessel for a material gas for generating ozone is irradiated with secondary x-rays generated from the target.

According to another preferred embodiment of the fifth invention, a hollow cathode is arranged around the hemimorphic crystal.

According to a further preferred embodiment of the fifth invention, at least two hemimorphic crystals are arranged oppositely to each other at a space therebetween in the low pressure gas sealing housing, and a heating and cooling means is provided to each of the hemimorphic crystals, and a ring-shaped ozonization chamber is arranged at the side of the space between the hemimorphic crystals opposed to each other, whereby the respective hemimorphic crystals are periodically and thermally excited in the same phase or in opposite phases.

According to a further preferred embodiment of the fifth invention, a number of hemimorphic crystals are arranged along an arched surface, and an ozonization chamber is arranged at the center portion of the arc.

In order to achieve the above described objects, according to the sixth invention, there is provided an ozone generation method, wherein a hemimorphic crystal is arranged in a low pressure gas sealing housing, and the hemimorphic crystal is repeatedly thermally excited in a cycle of a predetermined period of time, and thereby, soft x-rays are continuously generated from the hemimorphic crystal, and ozone is generated by irradiating a material gas for generating ozone with the x-rays.

In order to achieve the above described objects, according to the seventh invention, there is provided an ozone generation method, wherein a hemimorphic crystal is arranged in a sealed low pressure gas housing and thermally excited, and thereby, an intensive electric field is induced so as to make charged particles and x-rays be generated from the hemimorphic crystal and projected to an x-ray target, and then, a material gas for generating ozone is irradiated with secondary x-rays excited on the target, so as to generate ozone.

According to a preferred embodiment of the sixth and seventh invention, a number of hemimorphic crystals are arranged oppositely to each other, and the thermal excitation cycles of the respective crystals are controlled so as to be in the same phase or in opposite phases.

BEST MODE FOR CARRYING OUT THE INVENTION

Figure 1:
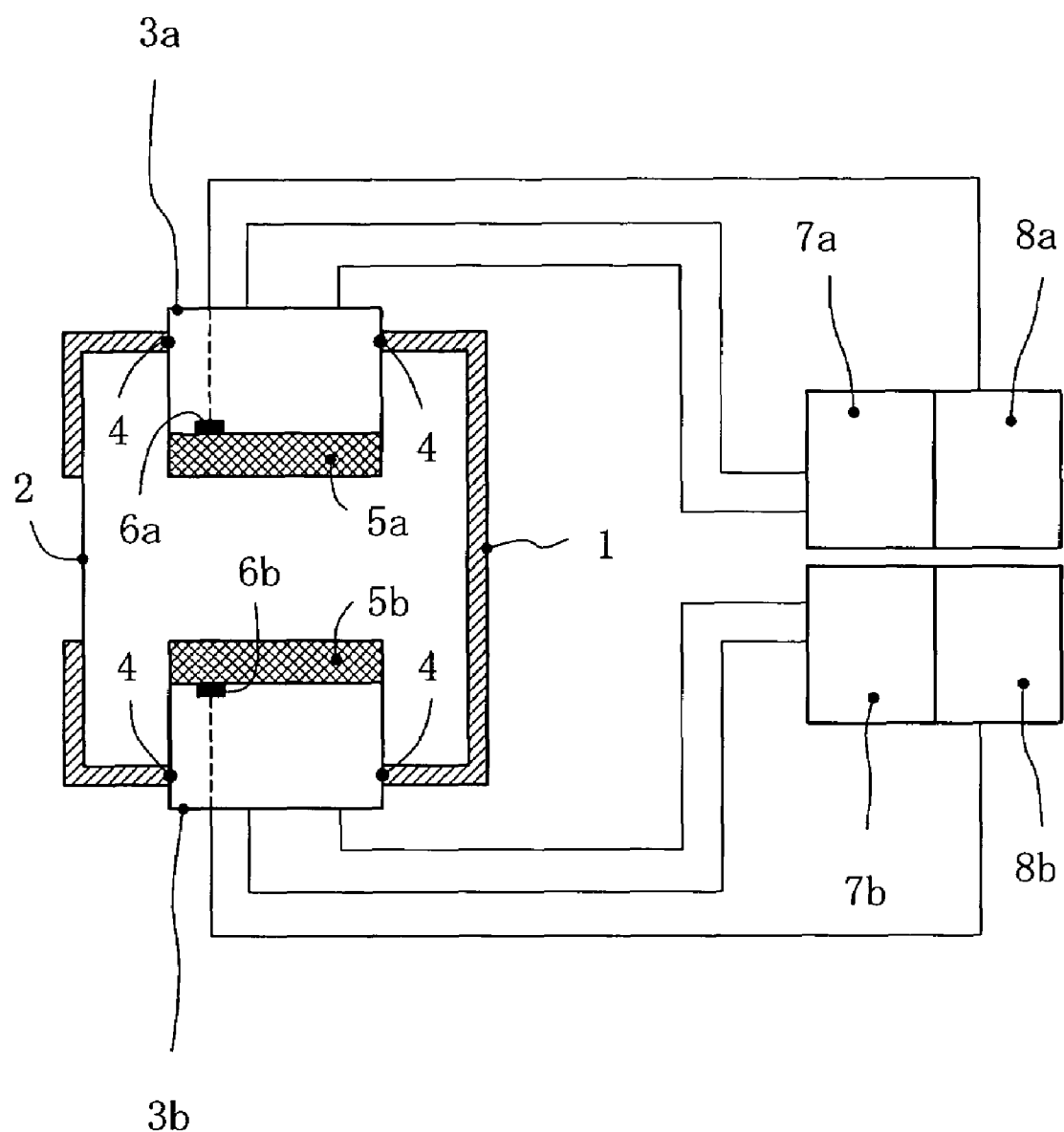
FIG. 1 is a diagram illustrating a schematic configuration of an x-ray generator employing hemimorphic crystals according to one embodiment of the present invention.

In the following, the best modes of the present invention are described with reference to the attached drawings. FIG. 1 is a diagram illustrating a schematic configuration of an x-ray generator employing a hemimorphic crystal according to one embodiment of the present invention. Referring to FIG. 1, the x-ray generator according to the present invention is provided with a vessel 1 for holding a low pressure gas atmosphere (3 Pa to 6 Pa) inside. In this embodiment, the vessel 1 has a form of a cylinder whose openings at two ends are closed, made of a material that does not transmit x-rays (such as a metal), and at least one x-ray transmission window 2, formed of, for example, Be or an x-ray transmitting plastic, is provided in a wall, such as a surrounding wall, of the vessel 1.

In addition, Peltier elements 3a and 3b are joined to the upper wall and the bottom wall of the vessel 1 via sealing members 4, such as O-rings for providing an air tight state. In this embodiment, the Peltier elements 3a and 3b function as heating and cooling means for repeatedly heating and cooling the hemimorphic crystals, and in addition, function as hemimorphic crystal supporting means. Thus, the hemimorphic crystals 5a and 5b are joined to and supported by substrates on the Peltier elements 3a and 3b at points on the inside of the vessel 1, and this pair of the hemimorphic crystals 5a and 5b are arranged oppositely to each other at a distance within the vessel 1. Here, in this embodiment, the pair of the hemimorphic crystals 5a and 5b have the same disc form, respectively, and in addition, the Peltier elements 3a and 3b also have corresponding columnar forms.

In the present invention, any type of known hemimorphic crystals, such as $LiNbO_3$ or $LiTaO_3$, can be utilized. In addition, the size of the hemimorphic crystals is not particularly limited, but in this embodiment, the pair of hemimorphic crystals have a diameter of approximately 10 mm and a thickness of approximately 1 mm to 10 mm, and are arranged so as to face each other at a distance of no greater than 20 mm.

Temperature sensors 6a and 6b for measuring the temperature are attached at appropriate points on the pair of the hemimorphic crystals 5a and 5b, respectively. Furthermore, power supply units 7a and 7b, made of, for example, batteries, for supplying power to the Peltier elements 3a and 3b, and control units 8a and 8b for controlling the operation of the Peltier elements 3a and 3b by controlling the power supply from the power supply units 7a and 7b on the basis of temperature detection signals from the temperature sensors 6a and 6b are arranged outside of the vessel 1.

Thus, the Peltier elements 3a and 3b, the temperature sensors 6a and 6b, and the power supply units 7a and 7b, as well as the control units 8a and 8b, form the heating and cooling means for elevating and lowering the temperature of the hemimorphic crystals 5a and 5b. The heating and cooling means 3a, 3b; 5a, 5b to 8a, 8b, can elevate and lower the temperature of the hemimorphic crystals 5a and 5b independently of each other at a variety of temperature gradients with a variety of periods or non-periodically. In this case, it is preferable for a period of time for elevating the temperature and for a period of time for lowering the temperature to be the same for each temperature elevating and lowering process, and it is preferable for the elevating and lowering of the temperature to be repeated between room temperature and an appropriate high temperature, no higher than, the Curie point of these hemimorphic crystals.

In this configuration, the pair of the hemimorphic crystals 5a and 5b are arranged oppositely to each other at their oppositely charged planes. Alternatively, the pair of the hemimorphic crystals 5a and 5b are arranged oppositely to each other at their planes having charge of the same sign.

In the case where the pair of the hemimorphic crystals 5a and 5b are arranged oppositely to each other at their oppositely charged planes, it is preferable for the heating and cooling means 3a, 3b; 5a, 5b to 8a, 8b to elevate and lower the temperature of the pair of the hemimorphic crystals 5a and 5b with the same temperature gradient and with the same period.

On the other hand, in the case where the pair of the hemimorphic crystals 5a and 5b are arranged oppositely to each other at their planes having charge of the same sign, it is preferable for the heating and cooling means 3a, 3b; 5a, 5b to 8a, 8b to elevate and lower the temperature of the pair of the hemimorphic crystals 5a and 5b with the same temperature gradient and with the same period, or with opposite temperature gradients and with the same period.

Figure 6:
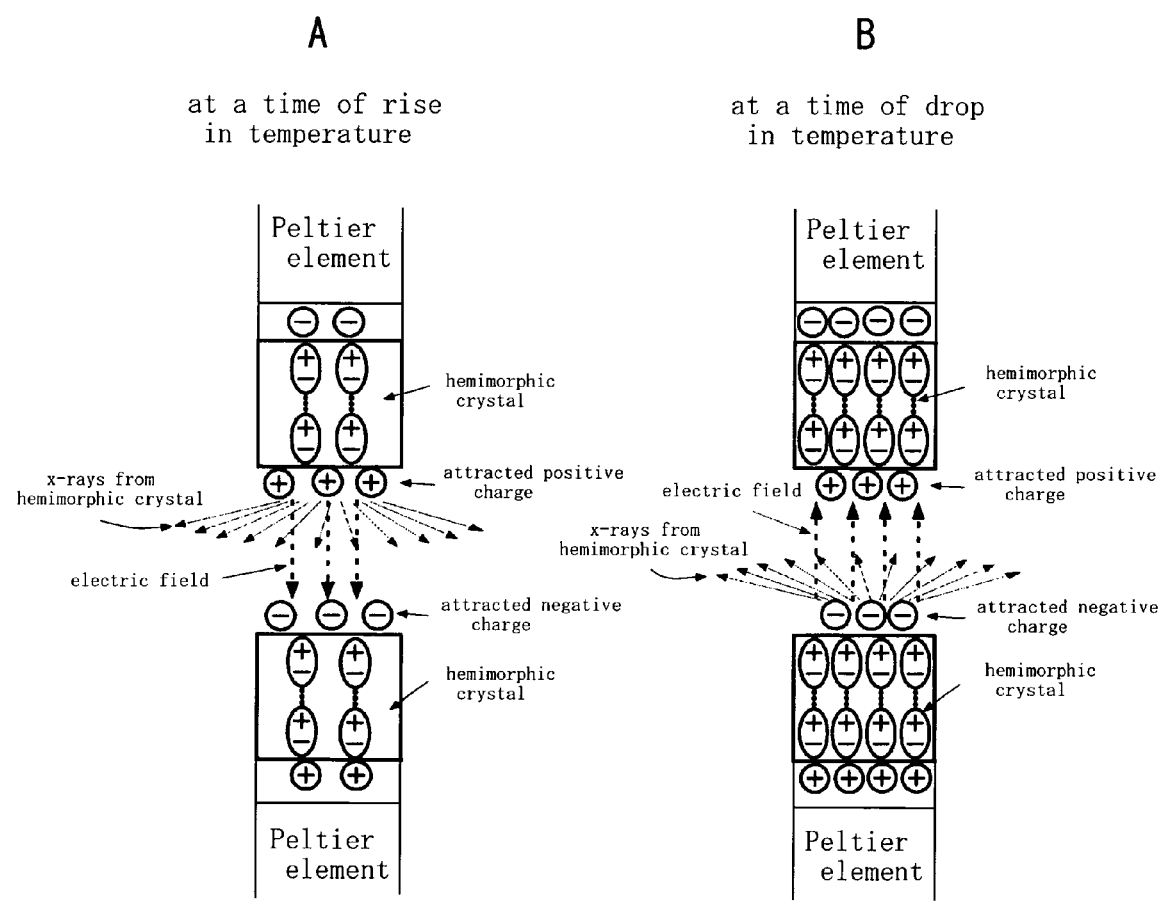
FIGS. 6A and 6B are diagrams illustrating the x-ray generation process in the x-ray generator of FIG. 1.

FIGS. 6(A) and 6(B) illustrate the process of x-ray generation in the configuration where a pair of hemimorphic crystals are arranged in such a manner that the surfaces having different types, positive and negative, of electricity face each other, and the temperature rises and lowers at the same temperature gradient and in the same period. In FIGS. 6(A) and 6(B), the pair of hemimorphic crystals are arranged in such a manner that a upper hemimorphic crystal faces its negatively charged plane toward a lower hemimorphic crystal, and the lower hemimorphic crystal toward its positively charged plane toward the upper hemimorphic crystal.

First, referring to FIG. 6(A), when the temperature of the pair of hemimorphic crystals rises at the same temperature gradient, the amount of positive charge generated on the plane of the lower hemimorphic crystal facing the upper hemimorphic crystal becomes smaller than the amount of negative charge attracted on the plane of this crystal, so that the plane thereof is substantially negatively charged. Meanwhile, the amount of negative charge generated on the plane of the upper hemimorphic crystal facing the lower hemimorphic crystal becomes smaller than the amount of positive charge attracted on the plane of this crystal, so that the plane thereof is substantially positively charged.

As a result of this, a high electric field is generated in a space between the pair of hemimorphic crystals in the direction from the upper crystal to the lower crystal. At this time, a low pressure gas (for example, oxygen) exists in the space between the pair of hemimorphic crystals, and this high electric field causes ionization of a portion of the gas, and thus, positively charged ions and electrons are generated so as to form plasma. In addition, discharge is generated between the pair of hemimorphic crystals due to the high electric field, and this accelerates further ionization of the gas.

Thus generated electrons and ions are accelerated in the directions opposite to and the same as that of the electric field, respectively, due to the high electric field that is generated between the pair of hemimorphic crystals. As a result of this, electrons, which are considered to greatly contribute to the generation of x-rays, collide with the surface of the upper hemimorphic crystal, and thus, characteristic x-rays inherent to all of the elements that form the upper hemimorphic crystal, and white x-rays that form a continuous spectrum are generated from this crystal, due to a bremsstrahlung mechanism.

Next, referring to FIG. 6(B), when the temperature of the pair of hemimorphic crystals lowers at the same temperature gradient, the amount of positive charge generated on the plane of the lower hemimorphic crystal facing the upper hemimorphic crystal becomes larger than the amount of negative charge attracted on the plane of this crystal, so that the plane thereof is substantially positively charged. Meanwhile, the amount of negative charge generated on the plane of the upper hemimorphic crystal facing the lower hemimorphic crystal becomes larger than the amount of positive charge attracted on the plane of this crystal, so that the plane thereof is substantially negatively charged.

As a result of this, a strong electric field is generated in the space between the pair of hemimorphic crystals in the direction from the lower crystal to the upper crystal. Then, electrons, which are considered to greatly contribute to the generation of x-rays, collide with the surface of the lower hemimorphic crystal, and thus, characteristic x-rays inherent to all of the elements that form the lower hemimorphic crystal, and white x-rays that form a continuous spectrum are generated from this crystal, due to a bremsstrahlung mechanism.

Thus, x-rays having the same spectrum are radiated from (the surface having negative electricity of) the upper hemimorphic crystal the temperature of the pair of hemimorphic crystals is elevated, and from the lower hemimorphic crystal when the temperature is lowered. That is to say, in this configuration, the temperature of the pair of hemimorphic crystals is repeatedly elevated and lowered at the same temperature gradient and in the same period, and thereby, the x-rays are radiated alternately from the upper and lower hemimorphic crystals, without intermittence.

As described above, the temperature of the pair of hemimorphic crystals arranged oppositely to each other is repeatedly elevated and lowered in the x-ray generator according to the present invention, and thereby, the x-rays are generated and radiated to the outside through the x-ray transmission window 2 which is provided to the vessel 1. In this case, the x-rays are radiated from the vessel 1 in the directions 20 when the entirety of the vessel 1 is formed of a material that has x-ray transmittance.

Here, though in this embodiment, only a pair of hemimorphic crystals is arranged oppositely to each other in the vessel, a number of pairs of hemimorphic crystals may be arranged oppositely to each other within the vessel, respectively, and in such a case, x-rays having higher intensity can be continuously gained.

In addition, though in this embodiment, Peltier elements are utilized as means for heating and cooling the hemimorphic crystals, the configuration of the present invention is not limited to this, but appropriate known means for repeatedly providing heat emitting and heat absorbing functions may be utilized as the means for heating and cooling the hemimorphic crystals. In such a case, it may be necessary to additionally provide hemimorphic crystal supporting means for supporting the hemimorphic crystals within the vessel.

According to the x-ray generator of the present invention, miniature hemimorphic crystals with power supplies of a small size, such as batteries, are used, so that a high electric field, such as one of several tens of kV/mm, is generated in a very compact configuration, and thereby, x-rays of which the intensity per area unit is significantly greater than that of electron gun systems can be continuously generated, unlike large scale x-ray generators of inefficient electron gun systems which utilize a high voltage power supply according to the prior art. That is to say, the x-ray generator according to the present invention is sufficiently practical for use, and can rearrange x-ray generators according to the prior art.

Furthermore, according to the present invention, a pair of hemimorphic crystals are arranged so as to face each other, and the x-rays are generated by heating and cooling these bodies, and therefore, it becomes possible to provide a practical x-ray generator which can continuously generate the x-rays of which the intensity is great, in comparison with the conventional x-ray generators which use a hemimorphic crystal so as to discontinuously generate x-rays having a small intensity.

In addition, the intensity of the generated x-rays can be increased by arranging an active plate (active layer) having a low work function, such as magnesium oxide (MgO) or calcium oxide (CaO), between the hemimorphic crystals and the heating and cooling means, in such a manner that charged particles, such as electrons, are discharged from the active plate due to the strong electric field that is generated by repeated heating and cooling of the hemimorphic crystals.

Figure 2:
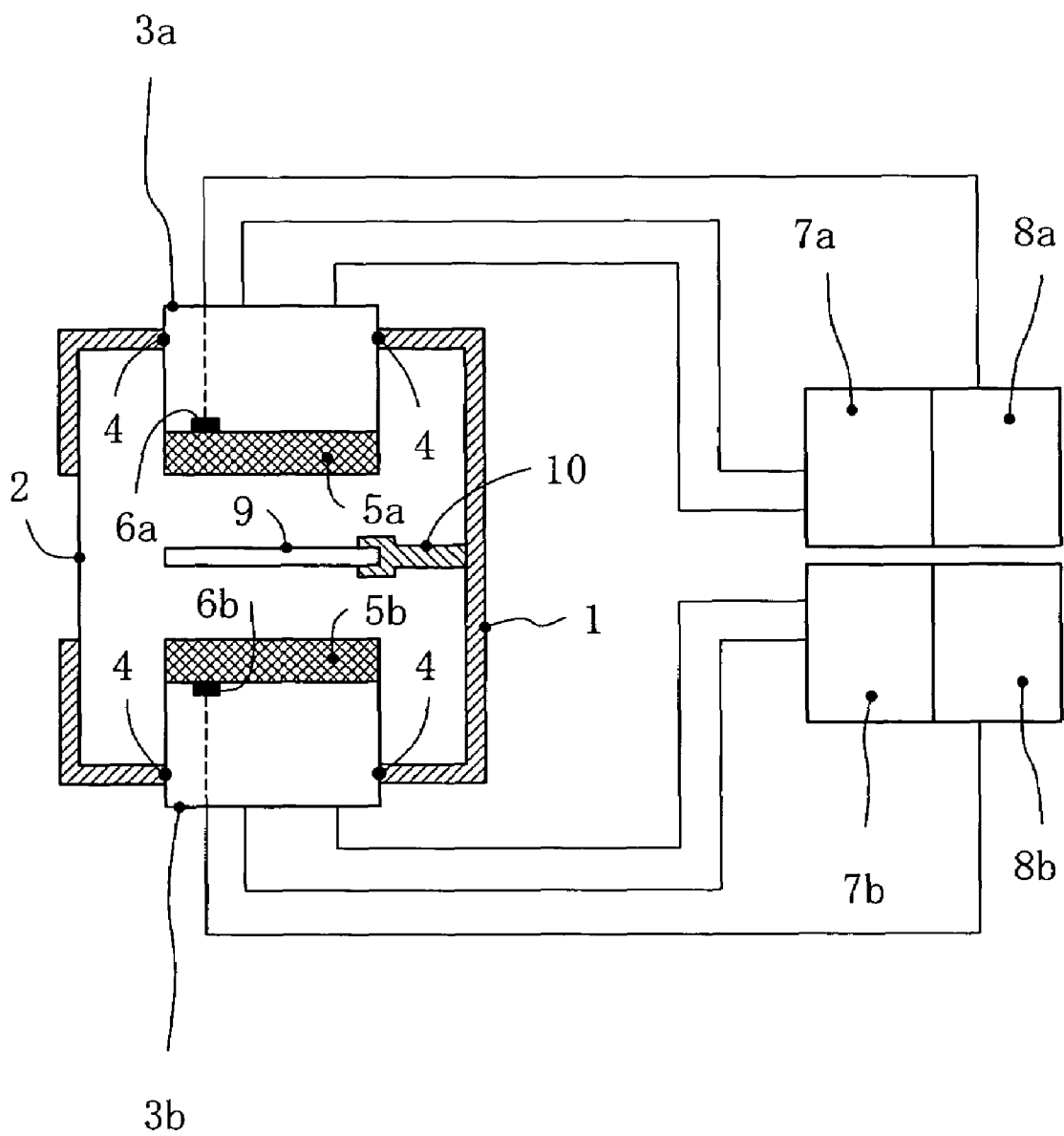
FIG. 2 is a diagram illustrating a schematic configuration of an x-ray generator employing hemimorphic crystals according to another embodiment of the present invention.

FIG. 2 is a diagram illustrating a schematic configuration of an x-ray generator employing the hemimorphic crystals according to another embodiment of the present invention. This embodiment is different from the embodiment of FIG. 1 only in that a metal target is arranged between a pair of hemimorphic crystals. Accordingly, in FIG. 2, the same numbers are attached to the components that have the same configuration as those of FIG. 1, and the descriptions thereof are omitted.

Referring to FIG. 2, a metal target 9 in plate form is arranged between a pair of the hemimorphic crystals 5a and 5b, and is supported by a target support 10, which is provided so as to protrude from an inner surface of a peripheral wall of the vessel 1.

In this embodiment, it is preferable for the pair of the hemimorphic crystals 5a and 5b to be arranged oppositely to each other at their oppositely charged planes. As a result, electric flux lines are generated in parallel between the pair of hemimorphic crystals when the temperature of the hemimorphic crystals 5a and 5b is elevated and lowered, and electrons that are generated from the hemimorphic crystals, as well as ions and electrons that are generated through the ionization of the gas that exists within the space between the pair of hemimorphic crystals, effectively collide with the target 9.

Figure 7:
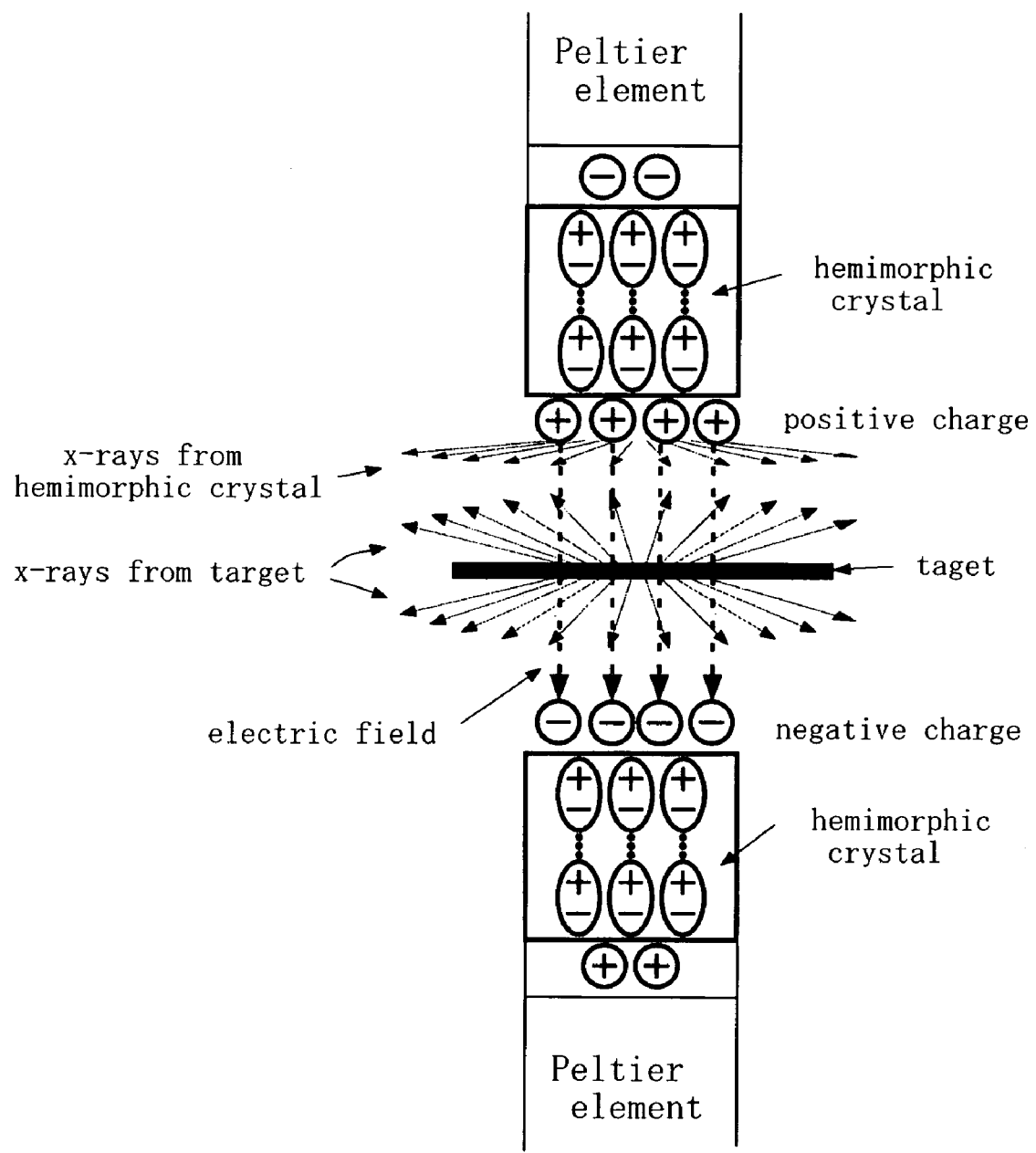
FIG. 7 is a diagram illustrating the x-ray generation process in the x-ray generator of FIG. 2.
Figure 8:
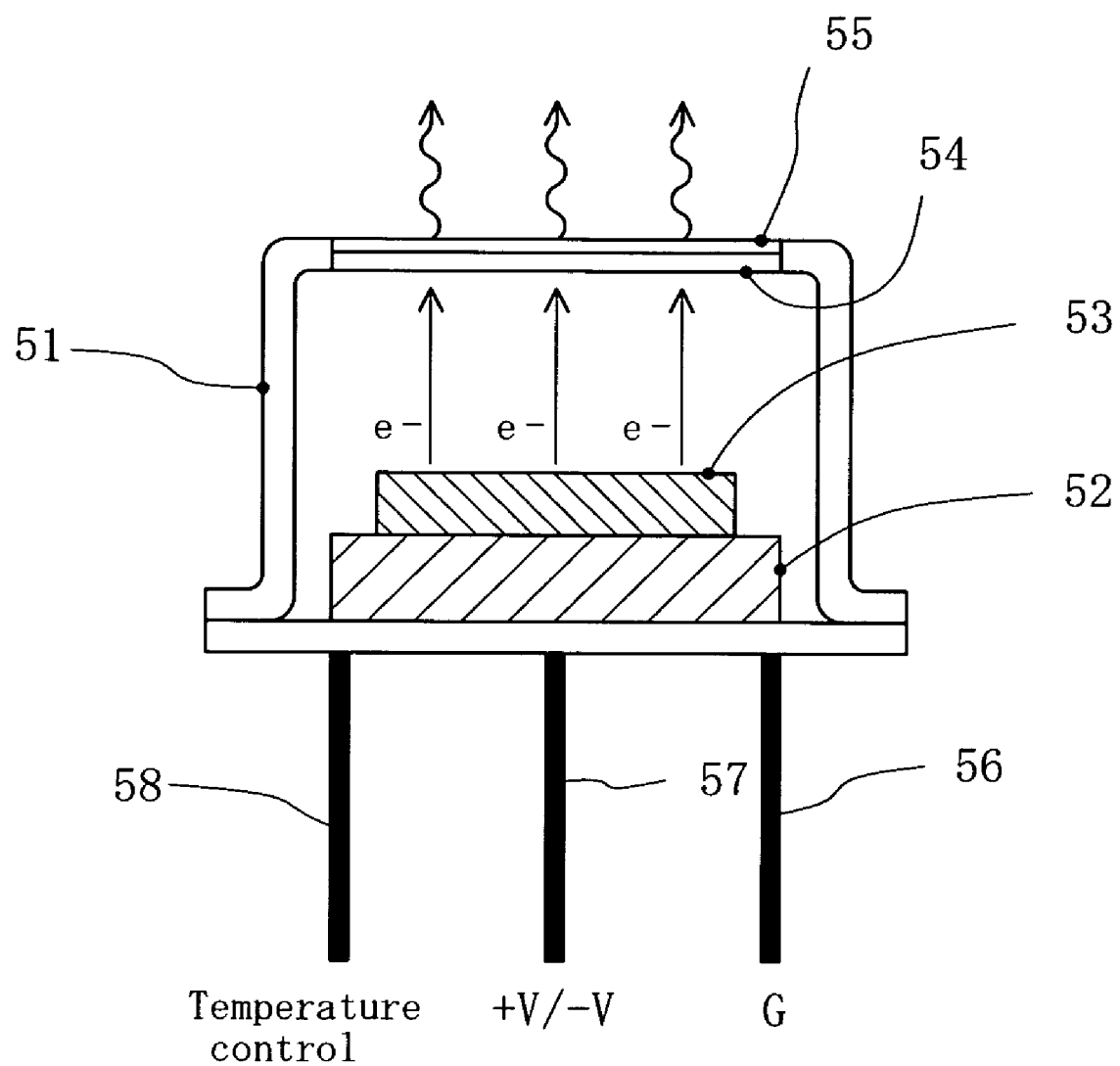
FIG. 8 is a schematic cross sectional diagram of an x-ray generator employing a hemimorphic crystal according to the prior art.

FIG. 7 illustrates the process of x-ray generation in the case of this embodiment. In FIG. 7, the pair of hemimorphic crystals are arranged in such a manner that the upper hemimorphic crystal facing its negatively charged plane toward the target, and the lower hemimorphic crystal facing its positively charged plane toward the target.

When the temperature of the pair of hemimorphic crystals is elevated at the same temperature gradient, the amount of positive charge generated on the plane of the lower hemimorphic crystal facing the target becomes smaller than the amount of negative charge attracted on the plane of this crystal, and thus, the plane thereof is substantially negatively charged. Meanwhile, the amount of negative charge generated on the plane of the upper hemimorphic crystal facing the target becomes smaller than the amount of positive charge attracted on the plane of this crystal, and thus, the plane thereof is substantially positively charged.

As a result of this, a high electric field is generated in the direction from the upper crystal to the lower crystal in the space between the pair of hemimorphic crystals. At this time, a low pressure gas (for example, oxygen) exists in the space between the pair of hemimorphic crystals, and a portion of the gas is ionized by this high electric field, and positively charged ions and electrons are generated, so that plasma is formed. In addition, in some cases, discharge is generated between the pair of hemimorphic crystals due to the high electric field, and this accelerates further ionization of the gas.

Thus generated electrons and ions are accelerated in the direction opposite to and the same as that of the electric field, respectively, due to the high electric field that is generated between the pair of hemimorphic crystals. As a result of this, the electrons, which are considered to greatly contribute to the generation of the x-rays, and which exist between the target and the lower hemimorphic crystal, collide with the target, and thus, characteristic x-rays inherent to the target, and white x-rays that form a continuous spectrum are generated from this target, due to a bremsstrahlung mechanism. In addition, the electrons, which exist between the upper hemimorphic crystal and the target, collide with the surface of the upper hemimorphic crystal, and thus, characteristic x-rays inherent to all of the elements that form the upper hemimorphic crystal, and white x-rays that form a continuous spectrum are generated from this crystal, due to a bremsstrahlung mechanism.

In this case, the x-rays are radiated in every direction in the space when the target is a foil having a thickness of approximately 1 μm to 5 μm, and the x-rays are radiated primarily to the space beneath the target when a thicker target is used.

When the temperature of the pair of hemimorphic crystals is lowered at the same temperature gradient, the amount of positive charge generated on the plane of the lower hemimorphic crystal facing the target becomes larger than the amount of negative charge attracted on the plane of this crystal, and thus, the plane thereof is substantially positively charged. Meanwhile, the amount of negative charge generated on the plane of the upper hemimorphic crystal facing the target becomes larger than the amount of positive charge attracted on the plane of this crystal, and thus, the plane thereof is substantially negatively charged.

As a result of this, a high electric field is generated in the direction from the lower hemimorphic crystal to the upper hemimorphic crystal in the space between the pair of hemimorphic crystals. Then, the electrons, which are considered to greatly contribute to the generation of the x-rays, and which exist between the target and the lower hemimorphic crystal, collide with the surface of the lower hemimorphic crystal, and thus, characteristic x-rays inherent to all of the elements that form the lower hemimorphic crystal, and white x-rays that form a continuous spectrum are generated from this crystal, due to a bremsstrahlung mechanism. In addition, the electrons which exist between the upper hemimorphic crystal and the target collide with the target, and thus, characteristic x-rays inherent to this target, and white x-rays that form a continuous spectrum are generated, due to a bremsstrahlung mechanism.

In this case, the x-rays are radiated in every direction in the space when the target is a foil having a thickness of approximately 1 μm to 5 μm, and the x-rays are radiated primarily to the upper space of the target when a thicker target is used.

According to this embodiment, characteristic x-rays inherent to the target and white x-rays that form a continuous spectrum can be generated in addition to the characteristic x-rays inherent to the elements that form the hemimorphic crystals and white x-rays that form a continuous spectrum.

Figure 3:
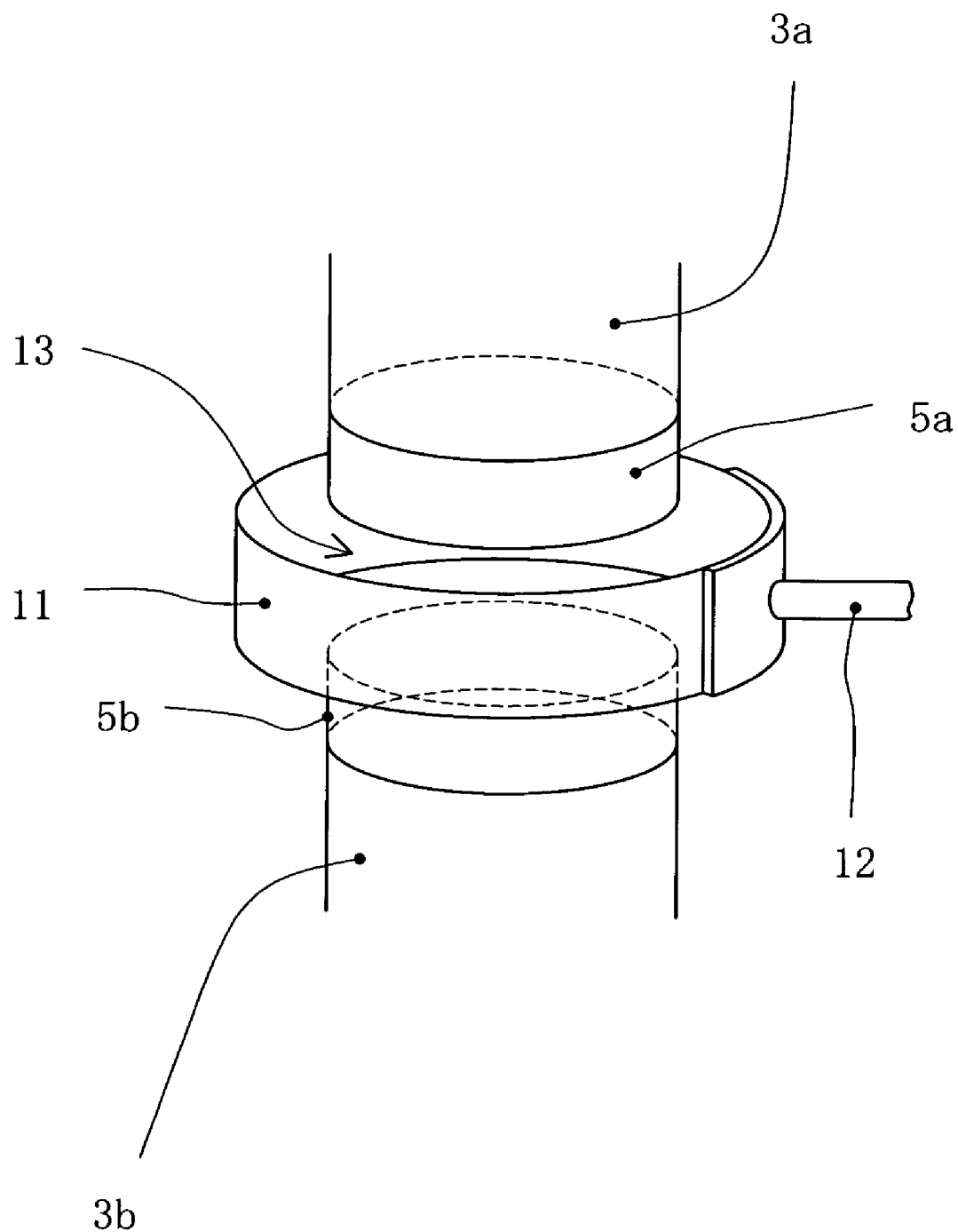
FIG. 3 is a perspective diagram illustrating the main portion of an x-ray generator employing hemimorphic crystals according to still another embodiment of the present invention.

FIG. 3 is a perspective diagram illustrating a main portion of an x-ray generator employing the hemimorphic crystals according to still another embodiment of the present invention. This embodiment is different from the embodiment of FIG. 2 only in the structure and the arrangement of the target. Accordingly, in FIG. 3, the same numbers are attached to the components which are the same as those of FIG. 2, and the vessel, the power supply unit and the control units are omitted, and the descriptions of these are omitted.

Referring to FIG. 3, a metal target 11 has a cylindrical form. The target 11 is arranged so as to surround a space 13 between the pair of the hemimorphic crystals 5a and 5b, and is supported by a target support 12 protruding from an inner surface of a peripheral wall of the vessel.

In this embodiment, the pair of the hemimorphic crystals 5a and 5b are arranged oppositely to each other at their planes having charge of the same sign. Thus, in the former case, the electric flux lines that respectively come out from the hemimorphic crystals 5a and 5b diverge infinitely in radiating directions through the gaps between the hemimorphic crystals 5a and 5b, while in the latter case, the electric flux lines are generated in the directions opposite to those of the former case. As a result of this, the electrons that are generated from the respective hemimorphic crystals 5a and 5b, as well as the ions and electrons that are generated through ionization of a gas which exists within the space between the hemimorphic crystals 5a and 5b effectively collide with the target 11, and thereby, characteristic x-rays inherent to the elements that form the hemimorphic crystals 5a and 5b, and white x-rays that form a continuous spectrum, as well as characteristic x-rays inherent to the target and white rays that form a continuous spectrum, are continuously radiated with high intensity from the x-ray transmission window of the vessel.

Figure 4:
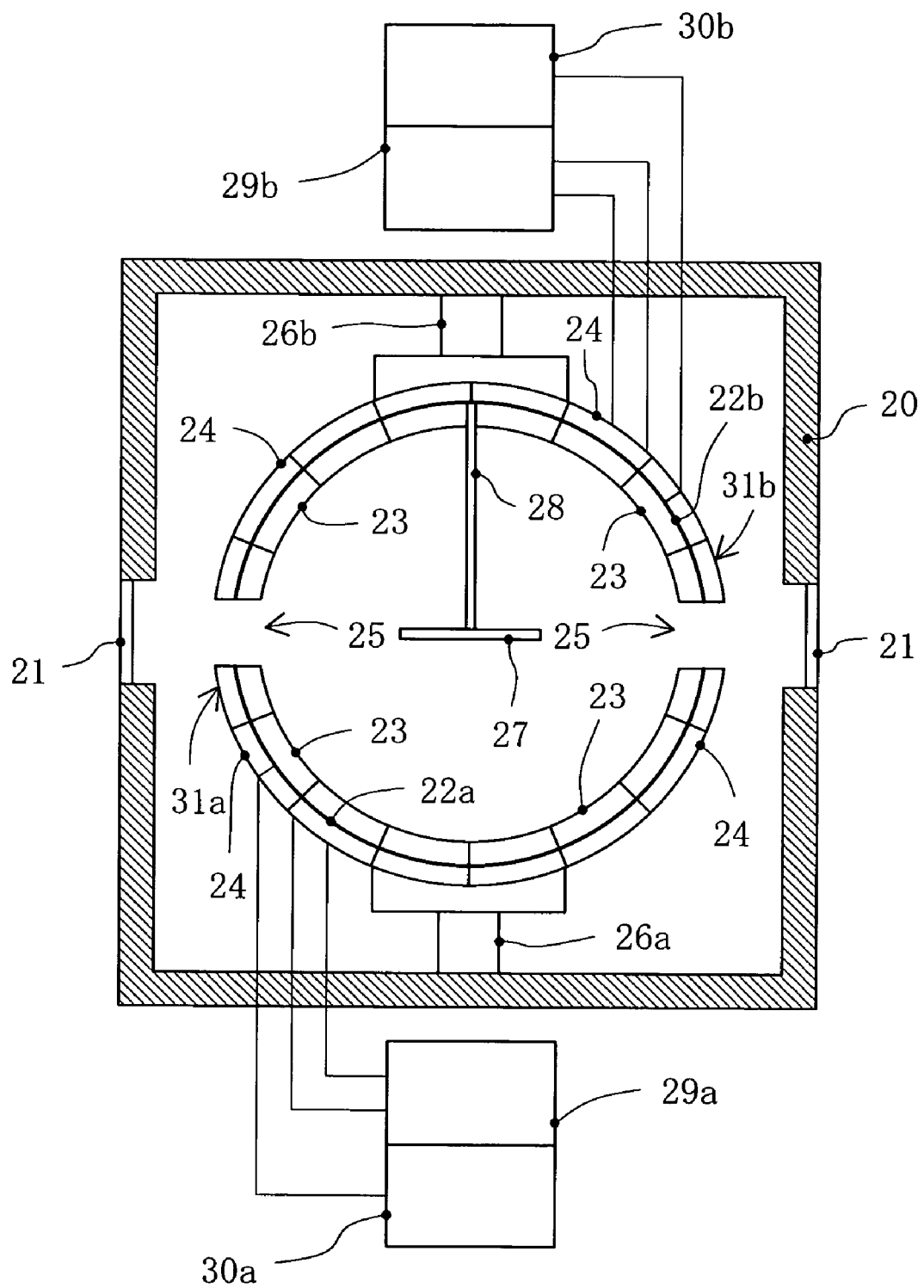
FIG. 4 is a diagram illustrating a schematic configuration of an x-ray generator employing hemimorphic crystals according to yet another embodiment of the present invention.

FIG. 4 is a diagram illustrating a schematic configuration of an x-ray generator employing the hemimorphic crystals according to yet another embodiment of the present invention. Referring to FIG. 4, the x-ray generator of the present invention is provided with a vessel 20 for holding a low pressure gas atmosphere (3 Pa to 6 Pa) inside. In this embodiment, the vessel 20 has a form of a cylinder whose openings at two ends are closed, made of a material blocking x-ray transmission (such as a metal), and at least one x-ray transmission window 21, which is formed of, for example, Be or an x-ray transmitting plastic, is provided to a wall, such as a peripheral wall, of the vessel 20. In this case, the x-ray transmission window 21 has a long slit form and is located approximately at the center of a surrounding wall of the vessel in a plane perpendicular to the axis of the vessel.

In addition, hemimorphic crystal supports 26a and 26b are provided on inner surfaces of the upper and bottom walls of the vessel 20. A pair of hemimorphic crystal aggregates 31a and 31b are supported by the hemimorphic crystal supports 26a and 26b in the vessel 20, and are arranged oppositely to each other at a distance.

The pair of the hemimorphic crystal aggregates 31a and 31b each composed of a number of hemimorphic crystals 23 that are arranged and supported on a concave side of half-cylindrical-shaped bases 22a and 22b. All of the hemimorphic crystals 23 constituting one of the hemimorphic crystal aggregate 31a face their positively charged planes toward the side apart from the base 22a, while all of the hemimorphic crystals 23 constituting the other of the hemimorphic crystal aggregate 31b face their negatively charged planes toward the side apart from the base 22b. In addition, the pair of the hemimorphic crystal aggregates 31a and 31b are arranged in such a manner that they face each other at the concave side apart from the base 22a and 22b thereof and a space 25 therebetween extending along the axis of these hemimorphic crystal aggregates 31a and 31b matches with the x-ray transmission window 21.

A metal target 27 in plate form is arranged between the pair of the hemimorphic crystal aggregates 31a and 31b, and is supported by a target support 28 provided to the base 22b of one of the hemimorphic crystal aggregate 31b. The target 27 is preferably arranged so that the two surfaces thereof face the hemimorphic crystal aggregates 31a and 31b, respectively.

Peltier elements 24 are attached to a convex side of the bases 22a and 22b correspondingly with the respective hemimorphic crystals 23 supported on the concave side of the bases 22a and 22b. The bases 22a and 22b have thermal conductivity, so that the hemimorphic crystals 23 are efficiently heated and cooled through the heat emitting and heat absorbing functions of the Peltier elements 24. The Peltier elements 24 are connected in series or in parallel for each of the hemimorphic crystal aggregates 31a and 31b so as to receive a power supply from corresponding one of power supply units 29a and 29b made of, for example, a battery, that is arranged outside of the vessel 20.

In addition, a temperature sensor, not shown, is provided to each of the hemimorphic crystal aggregates 31a and 31b, in order to detect the temperature of the hemimorphic crystals that form each hemimorphic crystal aggregate. Furthermore, a control unit 30a or 30b for controlling the operation of the Peltier elements 24 by controlling the power supply from the power supply unit 29a or 29b on the basis of a temperature detection signal from the temperature sensor is provided outside of the vessel 20.

Heating and cooling means for elevating and lowering the temperature of the hemimorphic crystal aggregates 31a and 31b are formed of the Peltier elements 24, the temperature sensors, and the power supply units 29a and 29b, as well as the control units 30a and 30b. The heating and cooling means 24; 29a, 29b; 30a, 30b can elevate and lower the temperature of the hemimorphic crystal aggregates 31a and 31b, independently from each other at a variety of temperature gradients with a variety of periods or non-periodically. In such a case, it is preferable to elevate or lower the temperature of the pair of the hemimorphic crystal aggregates 31a and 31b at the same temperature gradient and in the same period, and it is preferable for the period of time for elevating the temperature and the period of time for lowering the temperature to be the same for each temperature elevating or lowering process, and furthermore, it is preferable to repeatedly elevate and lower the temperature between room temperature and an appropriate high temperature, no higher than the Curie point of these hemimorphic crystals 23. In the case of this embodiment, the process of x-ray generation is the same as in the case of the embodiment of FIG. 2.

In this embodiment, a number of the hemimorphic crystals 23 are combined into the pair of the hemimorphic crystal aggregates 31a and 31b that are concavely curved (half-cylindrical-shaped), and the pair of the hemimorphic aggregates 31a and 31b are arranged oppositely to each other at their concave surface, and thereby, large amounts of electrons and ions can be generated, and a large amount of electrons can be made to collide with the target, in comparison with the case where a pair of single hemimorphic crystals are arranged so as to face each other in the configuration. As a result of this, the x-rays having a higher intensity can be continuously generated. In addition, in this embodiment, the x-rays that are generated in the space between the pair of the hemimorphic crystal aggregates 31a and 31b are radiated to the outside of the vessel through the space that extends in the axis direction of the pair of the hemimorphic crystal aggregates 31a and 31b, and through the x-ray transmission window 21 in slit form, and therefore, the x-rays in line form having an intensity that is appropriate for practical use can be gained.

Figure 5:
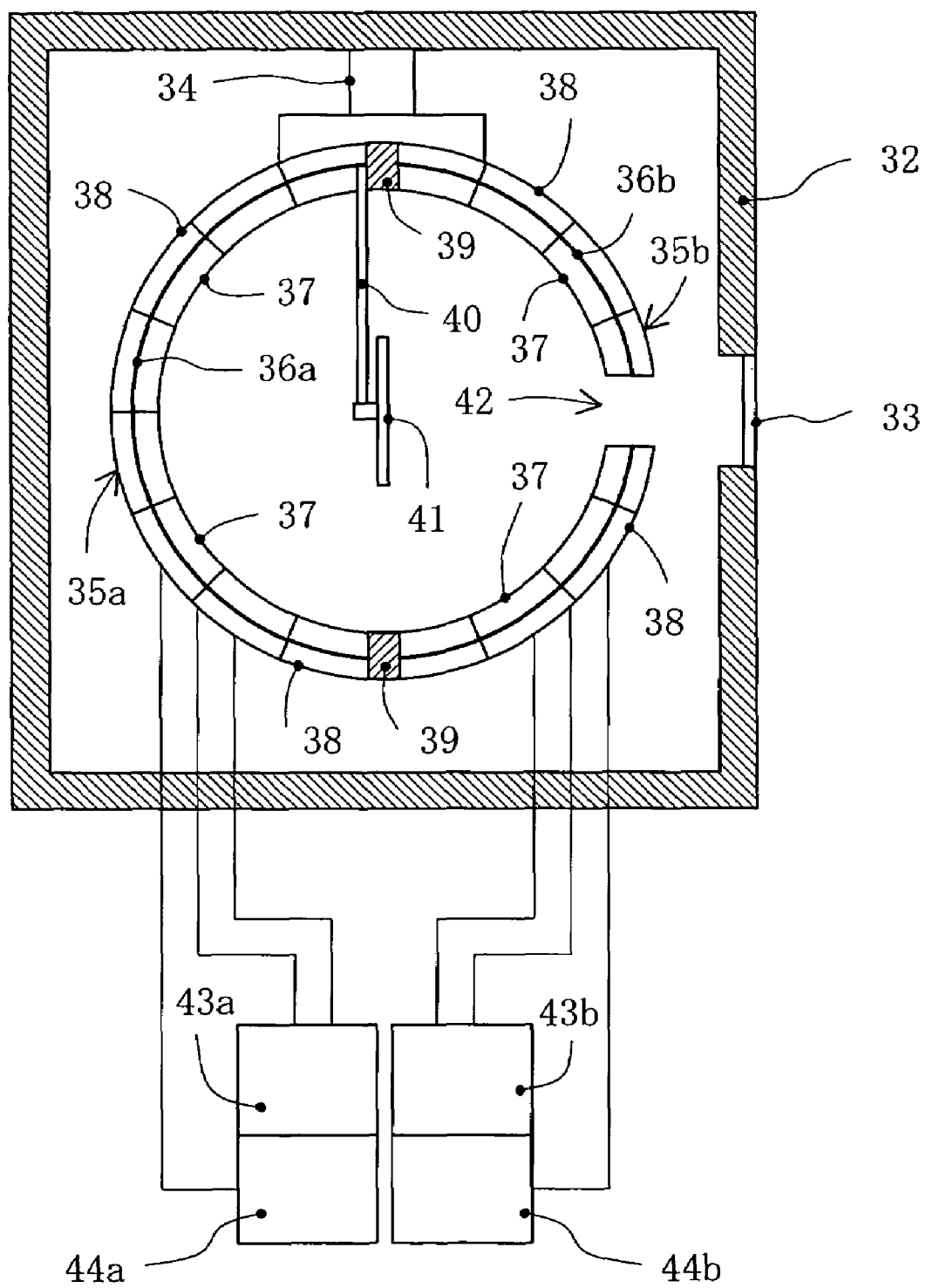
FIG. 5 is a diagram illustrating a schematic configuration of an x-ray generator employing hemimorphic crystals according to still yet another embodiment of the present invention.

FIG. 5 is a diagram illustrating a schematic configuration of an x-ray generator employing the hemimorphic crystals according to still yet another embodiment of the present invention. Referring to FIG. 5, the x-ray generator according to the present invention is provided with a vessel 32 for holding a low pressure air atmosphere (3 Pa to 6 Pa) inside. The vessel 32 has a form of a cylinder whose openings at two ends are closed, made of a material blocking x-ray transmission (such as a metal) and a circular x-ray transmission window 33 formed of, for example, Be or an x-ray transmitting plastic is provided to a portion of a peripheral wall of the vessel 32.

A hemimorphic crystal support 34 is provided to the inner surface of the upper wall of the vessel 32. In addition, a pair of hemimorphic crystal aggregates 35a and 35b are supported by the hemimorphic crystal support 34 inside the vessel 32, and are arranged oppositely to each other. The pair of the hemimorphic crystal aggregates 35a and 35b are each composed of a number of hemimorphic crystals 37 that are arranged and supported on a concave side of hemispherical shell-shaped bases 36a and 36b. All of the hemimorphic crystals 37 constituting one of the hemimorphic crystal aggregate 35a face their positively charged planes toward the side apart from the base 36a, while all of the hemimorphic crystals 37 constituting the other of the hemimorphic crystal aggregate 35b face their negatively charged faces toward the side apart from the base 36b.

In addition, a through hole 42 that extends in the radial direction is created in the hemimorphic crystal aggregate 35b.

The pair of the hemimorphic crystal aggregates 35a and 35b are arranged oppositely to each other at the concave side apart from the base 36a and 36b and are joined to each other through a ring 39 made of a dielectric material so as to form a spherical shell as a whole, where the through whole 42 is arranged so as to match with the x-ray transmission window 33 of the vessel 32.

A metal target 41 is arranged between the pair of the hemimorphic crystal aggregates 35a and 35b and is supported by a target support 40 that is provided to the base 36a of one of the hemimorphic crystal aggregate 35a. In this case it is preferable for the target 41 to be arranged at a position that includes the center of the spherical shell.

Peltier elements 38 are attached to a convex side of the bases 36a and 36b correspondingly with the respective hemimorphic crystals 37 supported on the concave side of the bases 36a and 36b. The bases 36a and 36b have heat conductivity and thus the heat emitting and heat absorbing functions of the Peltier elements 38 make the associated hemimorphic crystals 37 be efficiently heated and cooled. The Peltier elements 38 are connected in series or connected in parallel for each of the hemimorphic crystal aggregate 35a or 35b and receive a power supply from corresponding one of power supply units 43a and 43b made of, for example, batteries that are arranged outside of the vessel 32.

In addition, temperature sensors, not shown, for detecting the temperature of the hemimorphic crystals 37 constituting the respective hemimorphic crystal aggregates 35a and 35b are provided to the hemimorphic crystal aggregates. Furthermore, control units 44a and 44b for controlling the operation of the Peltier elements 38 by controlling the power supplies from the power supply units 43a and 43b on the basis of the temperature detection signals from the temperature sensors are provided outside of the vessel 32.

Heating and cooling means for elevating and lowering the temperature of the hemimorphic crystal aggregates 35a and 35b is constituted from the Peltier elements 38, the temperature sensors, the power supply units 43a and 43b as well as the control units 44a and 44b. Here, the temperature elevating and lowering operation of the hemimorphic crystal aggregates by means of the heating and cooling means is the same as in the case of the embodiment of FIG. 4 and, in addition, the process of x-ray generation is the same as in the case of the embodiment of FIG. 4.

According to this embodiment, the electric flux lines which are generated between the pair of the hemimorphic crystal aggregates 35a and 35b become quite dense in the vicinity of the center of the spherical shell, and therefore, the intensity of the characteristic x-rays which are generated from the target 41 becomes higher than that in the case of the embodiment of FIG. 4. Furthermore, the x-rays that are generated inside the spherical shell (inside the pair of the hemimorphic crystal aggregates 35a and 35b) pass through the hole 42 and the circular x-ray transmission window 33 so as to be radiated from the vessel 32 to the outside. Thus, according to this embodiment, the x-rays in dot form having a high intensity that is appropriate for practical use are gained.

Here, though the temperature of the hemimorphic crystals that are arranged to face each other is elevated and lowered so as to generate the x-rays according to the present invention, an alternating voltage may be applied to the hemimorphic crystals so as to cause electrostriction in the hemimorphic crystals, and thereby, the x-rays may be generated in the same manner as when the temperature is elevated and lowered.

Figure 9:
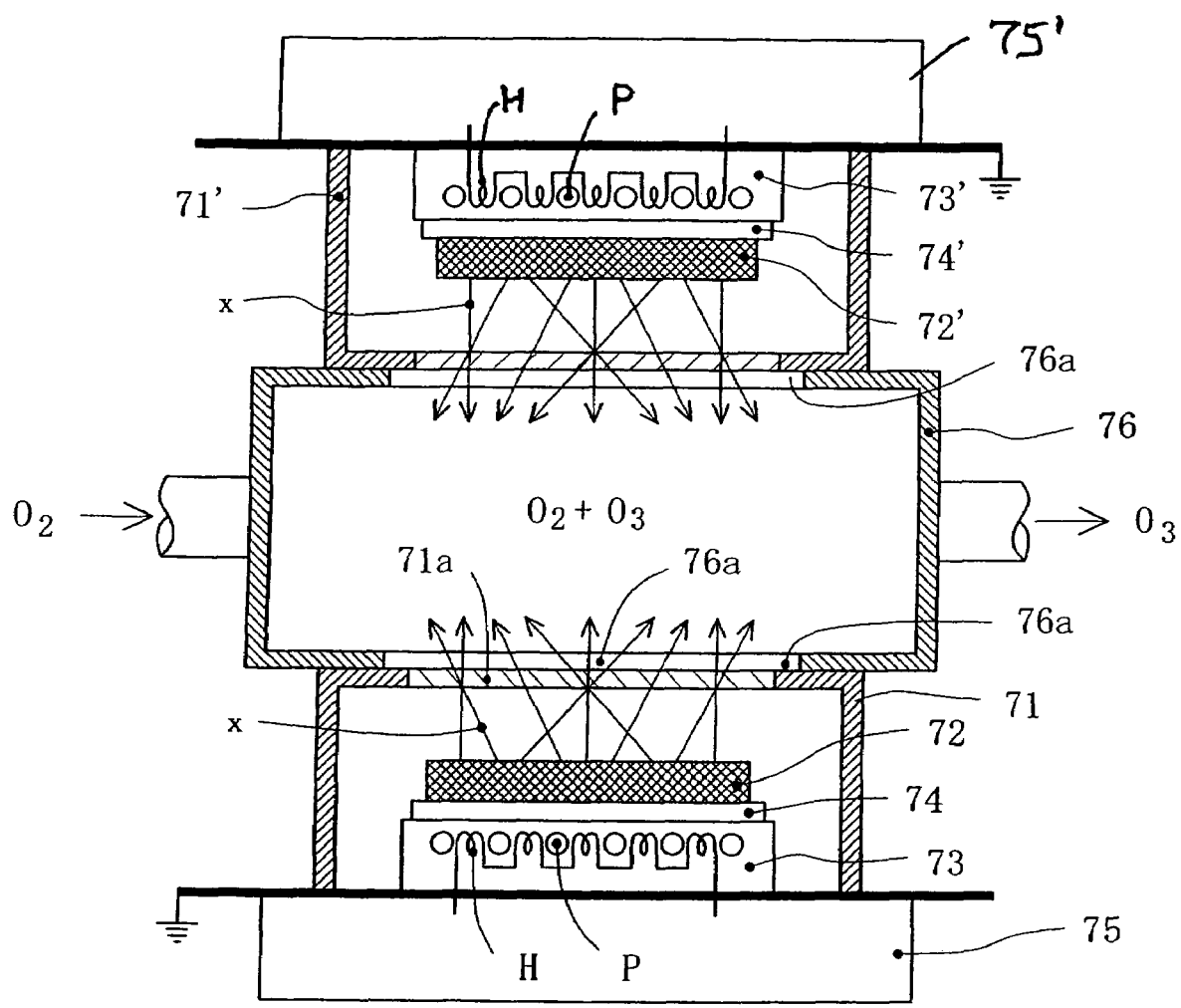
FIG. 9 is a diagram illustrating the basic concept of an ozone generation method and unit according to the present invention, and illustrating an example where two thermal excitation x-ray sources are arranged across an ozonization chamber so as to face each other.

FIG. 9 is a diagram illustrating the basic concept of an ozone generanon method and unit according to the present invention and a reference numeral 71,71' indicates a housing that surrounds a low gas pressure area of approximately 3 Pa to 6 Pa and a reference numeral 72, 72' indicates a hemimorphic crystal which is a single crystal plate made of lithium niobate ($LiNbO_3$) which is installed in such a manner that the surface having positive electricity faces upward (in the direction so as to face the ozone chamber). A reference numeral 73, 73' indicates a temperature elevating and lowering stage for the heating and cooling crystal plate 72, 72' in a predetermined period, in which H indicates a heater wire and P indicates a pipe for refluxing the cooling water. A reference numeral 75, 75' indicates a control unit for controlling the energization and deenergization of this heater and the supply and blockage of the cooling water, and a reference numeral 76 indicates a vessel that form an ozonization chamber into which a gas that includes oxygen ($O_2$) is introduced from the left of FIG. 9 so that the ozonization reaction progresses within the vessel 76 and a gas that includes ozone ($O_3$) is discharged to the right. A reference numeral 74, 74' indicates an active layer having a low work function which is installed between the crystal plate 72, 72' and temperature elevating and lowering stage 73, 73' and is appropriately made of magnesium oxide (MgO) or calcium oxide (CaO). This active layer 74, 74' is made to adhere, and is electrically connected, to the upper surface of the block of the temperature elevating and lowering stage 73, 73' via an adhesive layer such as a silver paste.

The operation where the temperature elevating and lowering stage 73, 73' is heated by heater H to, for example, approximately 200° C. and, after that, the heater is de-energized and at the same time the cooling water is refluxed into the pipe P so that the temperature elevating and the lowering stage is quenched to, for example, approximately room temperature is repeated in a constant cycle. The temperature elevating and lowering cycle is program-controlled by the temperature control unit 75, 75'.

As a result of this, the temperature of the hemimorphic crystal plate 72, 72' is repeatedly elevated and lowered between 200° C. and room temperature via the active layer 74, 74' and thereby, the spontaneous polarization within the crystal 72, 72' progresses causing the upper surface and the lower surface of the crystal to alternately become a high potential surface. As a result, an intensive electric field is generated around the crystal and the characteristic x-rays originated from the elements that form the crystal are generated from the surface of this crystal due to an excitation function caused by this intensive electric field. It is desirable for the temperature cycle in this case to be a period where heating and cooling are repeated at approximately 5 minute to 10 minute intervals. In accordance with the experiments conducted by the present inventors, in the case of an $LiNbO_3$ crystal, the white x-rays having a continuous energy are generated together with the characteristic x-rays of the crystal forming elements, that is to say, niobium (Nb), lithium (Li) and oxygen (O) during the process of lowering the temperature. These x-rays having a low energy are generated and radiated from the surface of the crystal in every direction as shown by X in FIG. 9, and then, reaches an ozonization chamber 76 through an x-ray transmission window 71a, 71a' (only this portion is made of, for example, a beryllium film) in an upper portion of the housing 71, 71' which holds a low pressure gas atmosphere inside. In addition, charged particles such as electrons are discharged from the active layer 74, 74' due to an intensive electric field generated through the thermal excitation of the crystal 72, 72' and such electrons are accelerated by the above described electric field and collide with a microscopic amount of gas molecules within the housing 71, 71' so as to generate the x-rays, and therefore, these x-rays also contribute to the ozonization reaction in the ozonization chamber.

Furthermore, electrons that have been discharged around the crystal collide with the crystal itself, due to a change in the potential caused by a change in the temperature of the crystal, and this also causes the characteristic x-rays to be generated from the crystal.

In this manner, a temperature cycle of elevating and lowering the temperature is provided to the crystal plate, and thereby, the characteristic x-rays and white x-rays are continuously generated from the surface, sides, and bottom of the crystal plate, and therefore, the ozonization chamber is irradiated with these x-rays through the x-ray transmission window, and thereby, the ozonization reaction can be made to continuously progress. Here, an x-ray incident surface 76a of the ozonization chamber 76 may be formed of an x-ray transmitting thin film, or the entirety of the component members of the chamber 76 may be formed of an x-ray transmitting plastic.

In addition, the x-rays that have been generated in this manner are soft x-rays having a low energy of 3 KeV to 6 KeV, and therefore, are immediately eliminated after affecting the ozone reaction in the ozonization chamber (under normal air pressure), and barely reach the outside of the chamber. Accordingly, it is not necessary to consider radiation damage or protection from radiation.

Here, FIG. 9 illustrates an example where an x-ray generation part, denoted by 71, 71', 72, 72', 73, 73', 74 and 74', which repeatedly heats and cools a hemimorphic crystal plate periodically (thermal excitation) is additionally installed above the ozonization chamber 76, in order to enhance the efficiency of ozonization by irradiating the ozonization chamber with the x-rays of which the amount is twice as large. In this case, the heating and cooling cycle (thermal excitation cycle) is controlled so as to provide opposite phases in such a manner that when one crystal plate 72 is in the rising temperature phase of the cycle, the other crystal plate 72' is in the lowering temperature phase of the cycle, and thereby, the x-rays are alternately projected into the ozone generation part, and thus, the x-rays can be efficiently and continuously generated. Of course, it is also possible to control the thermal excitation cycle of the two crystals in the same phase, and in such a case, the x-rays of which the amount is twice as large are radiated intermittently to the ozone generation part according to the same timing. It is clear that a great amount of ozone can be continuously generated by installing the x-ray generation parts as described above as four points, six points or the like in the case where the ozonization chamber is larger. In such a case, the object of the present invention can be achieved even when the active layer 74, 74' is not specially provided.

Figure 10:
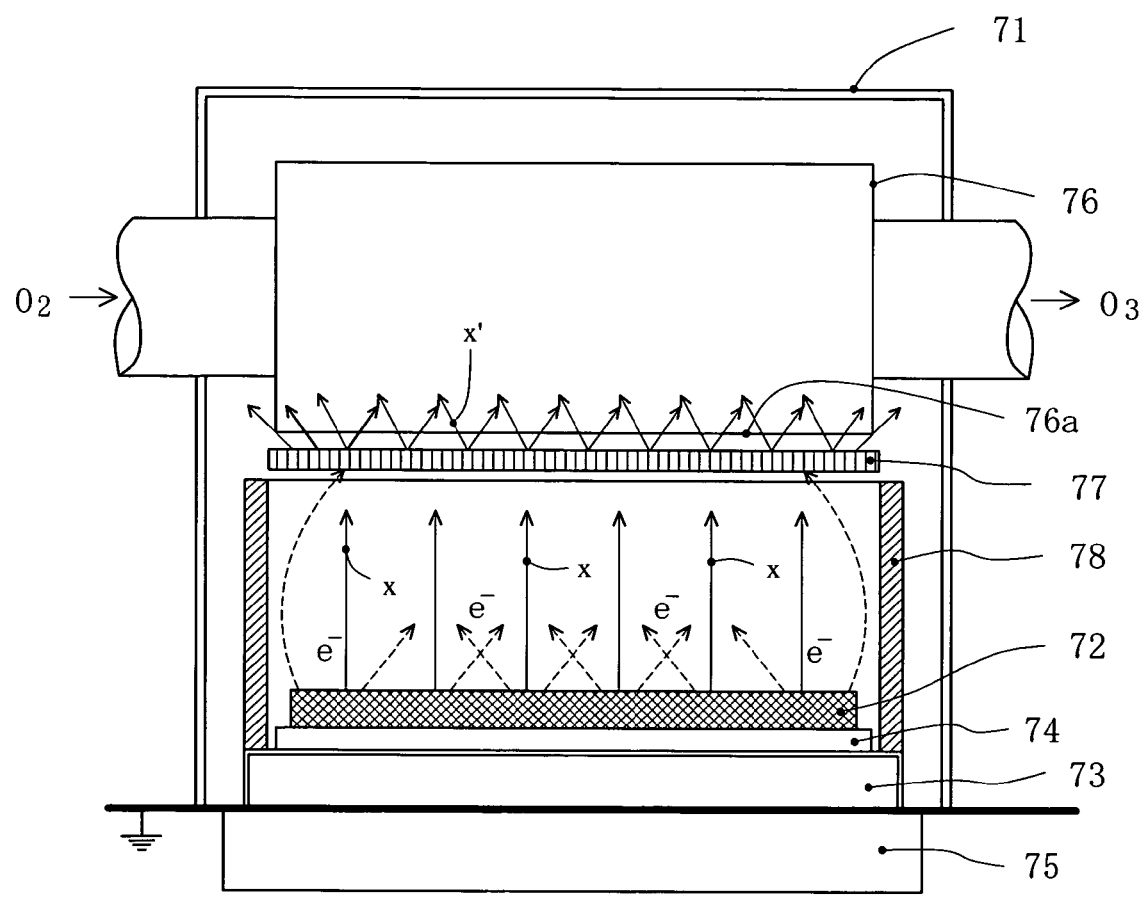
FIG. 10 is a diagram illustrating an example where an x-ray target and a hollow cathode are irradiated with x-rays and charged particle beams generated through thermal excitation of a hemimorphic crystal, and ozone is generated by means of thus generated secondary x-rays.

FIG. 10 shows an example where the ozonization chamber 76 has been introduced within the low pressure gas housing 71, where an x-ray target 77 of a metal, such as copper (Cu), aluminum (Al), magnesium (Mg), vanadium (V) or the like is provided between the hemimorphic crystal plate 72 and the ozonization chamber 76. The mechanism of x-ray generation in plane form through periodic thermal excitation of the crystal plate 72 is approximately the same as in the case of FIG. 9, which shows an example where the x-rays that have been radiated from the crystal itself are made to collide with the x-ray target 77 again, and at the same time, electrons (e−) that have been discharged around the crystal are also made to collide with this target 77, and thereby, secondary characteristic x-rays having high energy originating from elements such as copper which form this target 77, as well as white x-rays X' having continuous energy are generated from the target 77 so that ozonization is carried out with these characteristic x-rays having high. The symbols in FIG. 10 indicate the same members as those in FIG. 9. A target of which the material, for example, Al or Ti, can be arbitrarily or selectively changed can be provided in this manner, and thereby, the x-rays having a wavelength range which is optimal for the ozonization of an ozonization material gas in accordance with the properties of this gas can be selectively generated from such a target, making it possible to provide ozonization under optimal conditions. This target may be made of a thin film material, and in addition, a potential may be applied between the crystal plate (grounding potential) and the target, though it is generally unnecessary to provide a potential in the case of ozonization.

Here, a reference numeral 78 indicates a hollow cathode tube of such as graphite (insulator). The hollow cathode tube 78 smoothly leads charged particles discharged from the crystal to the target by means of an electric field generated by itself, and accelerates the generation of secondary x-rays caused by electron beams and x-rays which are generated from the crystal. This cathode tube may be made of another insulating material, a semiconductor substance, or a metal.

Figure 11:
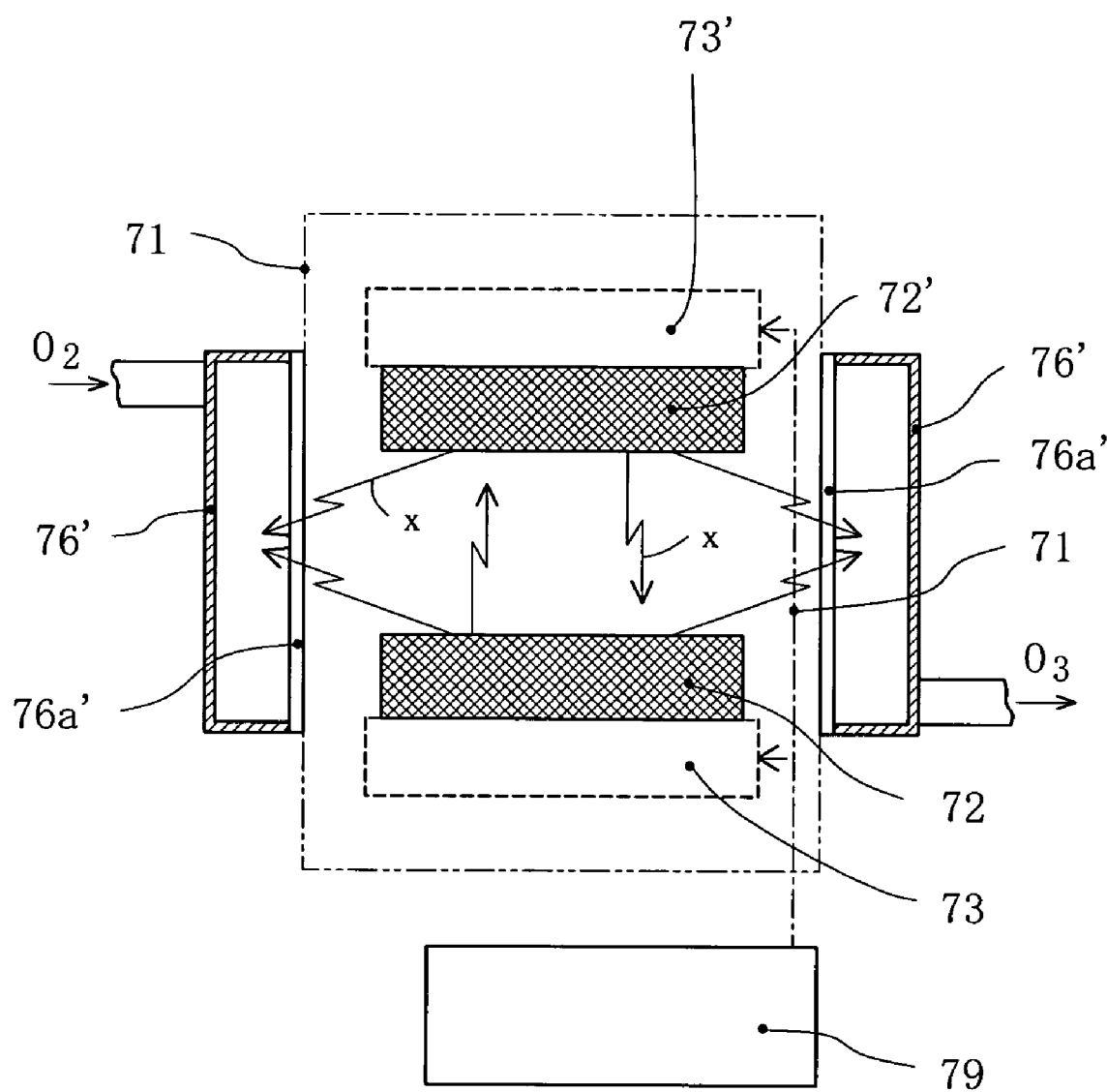
FIG. 11 is a cross sectional diagram of an ozone generator where two hemimorphic crystals are arranged within a low pressure sealing housing so as to face each other, and x-rays thermally excited by these are made to synergistically contribute to the generation of ozone.
Figure 12:
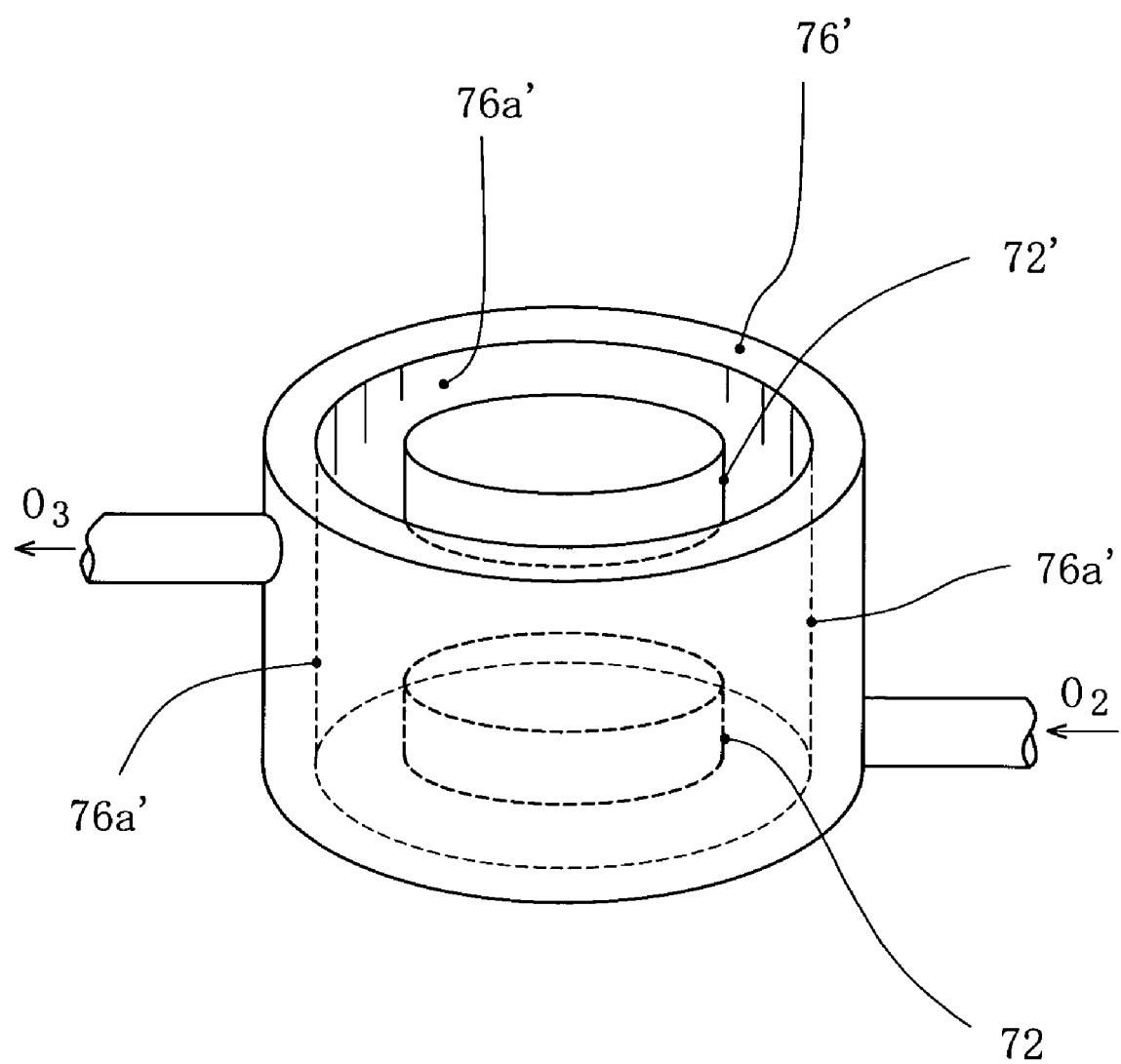
FIG. 12 is a perspective diagram illustrating the principle of operation of the ozone generator of FIG. 11.

FIGS. 11 and 12 show an example where two hemimorphic crystals 72 and 72' are arranged so as to face each other within the low pressure gas housing 71, stages 73 and 73' for periodically heating and cooling the respective crystals are provided to the base surfaces of the crystals, and an annular ozonization chamber 76' having a rectangular cross section is arranged on the outer side of the housing 71 so as to surround the housing. In this example, the temperature elevating and lowering stages 73 and 73' are formed of the Peltier effect elements, and energizing currents thereof are periodically switched in opposite directions by means of a control circuit 79, and thereby, the crystals are repeatedly heated and cooled.

In this case, the Peltier currents are controlled so as to be in opposite phases, in such a manner that when one crystal 72 of the pair that face each other is in the cooling phase of the cycle, the other crystal 72' is in the heating phase of the cycle. Namely, when the crystal 72 is in the process of cooling, the characteristic x-rays and white x-rays having continuous energy are generated from this crystal 72 in radiating form, and are projected into the ozonization chamber 76' through an x-ray transmission window 76a', so as to contribute to the ozonization reaction in the gas within the chamber. In addition, the x-rays that have been generated in this manner partially collide with the facing crystal 72', and therefore, the x-rays are excited on the facing crystal 72'. As described above, the x-rays that have been directly generated from the crystal 72 and secondary x-rays from the facing crystal 72' are projected together into the ozonization chamber 76', and therefore, a greater amount of x-rays is projected into the ozonization chamber.

When the crystal 72 is in the rising temperature phase and the crystal 72' is in the lowering temperature phase in the next cycle, the soft x-rays are generated in radiating form from the crystal 72' and projected into the ozonization chamber 76', and thus, these x-rays collide with the facing other crystal 72 in the same manner as described above, causing secondary x-rays to radiate from this crystal, and together, these x-rays accelerate the ozonization.

As described above, in the case where the heating and cooling cycle of one crystal and the cooling and heating cycle of the other crystal are controlled so as to be in opposite phases, a large amount of x-rays can be continuously generated as a result of synergic effects, further increasing the efficiency of ozone generation. In addition, in the case where the thermal excitation cycle of the two crystals is controlled so as to be in the same phase, the soft x-rays having energy that is approximately two times higher can be intermittently generated. Here, though in the perspective diagram of FIG. 12, the temperature elevating and lowering stages 73 and 73', vacuum (low pressure gas) the housing 71 and the control circuit 79 are omitted, the temperature elevating and lowering stages made of the Peltier effect elements are provided to the respective crystals, so that the timing for heating and cooling the respective crystals can be controlled by the control part 79. In this case, the housing 71 is formed so as to have a drum can form.

Figure 13:
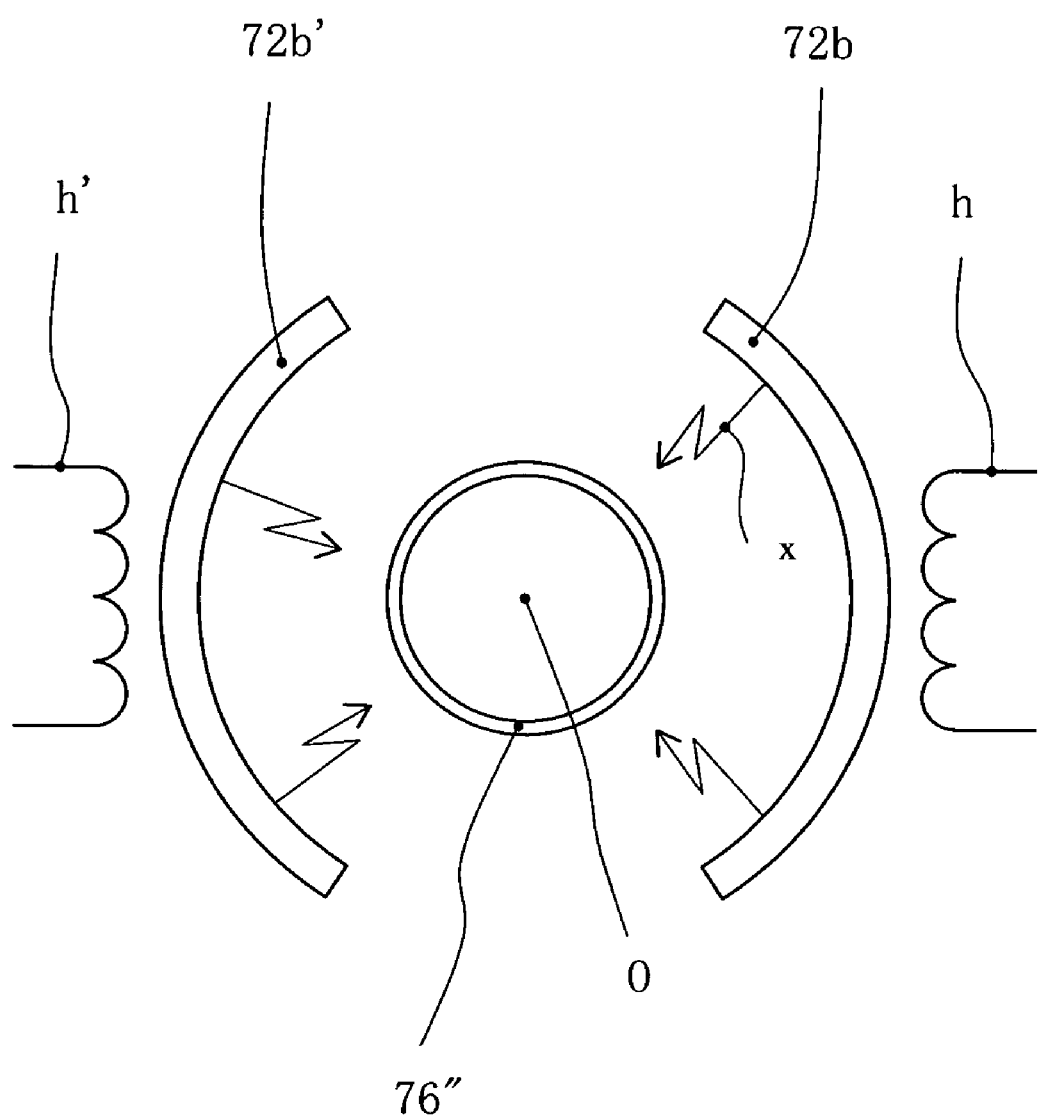
FIG. 13 is a diagram illustrating an example of the operation of an ozone generator where a number of hemimorphic crystal plates are arranged along an arched surface.

FIG. 13 shows an example where the two hemimorphic crystals 72b and 72b' are arranged along an arched surface having a dot O as the center, and face each other, and the ozonization chamber 76" is provided in the vicinity of the center. For the purpose of convenience, the example shows that thermal cycle excitation of the respective crystals is carried out by heater wires h and h'. In this case, the x-rays generated form the respective crystals are concentrated on and directed to the center O, as shown by bent arrows X, and therefore, the x-rays can be projected into the ozonization chamber 76" with higher density. In this case, an ozone material gas is introduced into and exhausted from the ozonization chamber, in the direction perpendicular to the surface of the figure. In addition, the material of the ozonization chamber in pipe form is selected from x-ray transmitting materials, such as x-ray transmitting plastics and aluminum.

In this case, though two crystal plates are arranged along the arched surface and face each other in the figure, four crystal plates may be arranged along the arched surface at intervals of approximately 90°, or a greater number of hemimorphic crystal plates may be arranged along the arched surface. In addition, the system may be provided so that the x-ray excitation can be carried out under optimal conditions in accordance with the capacity of the ozone chamber, the composition and the amount of flow of the material gas, in such a manner that a pair of crystal plates that face each other are formed of single crystal plates of lithium niobate, and the other pair are formed of single crystal plates of lithium tantalite, so that the respective crystal plates are periodically controlled so as to be heated and cooled in the same phase, in opposite phases, or in different phases of the thermo excitation cycle. The crystal plates may, of course, be in plate form and arranged in parallel, as shown in FIG. 11, and small crystals in plane form may be arranged along a number of arched surfaces or spherical surfaces, and thereby, the generated x-rays may be directed to the center. Here, the ozonization chamber is arranged within a vacuum or low pressure gas housing into which a material gas is continuously supplied via pipes from the outside of the housing, and from which the generated ozone gas is supplied via an exhaust pipe to a sterilization chamber or a disinfection chamber.

In the above described embodiments, $LiNbO_3$, $LiTaO_3$ or glycine sulfate (TGS) are practical for use for the hemimorphic crystals that become the x-ray sources, and other hemimorphic crystals (pyroelectric crystals) can also be utilized.

Though it is desirable for the area of the crystals to be as large as possible, crystal plates in disc form or square form having a diameter or a side of approximately 30 mm to 60 mm are sufficient, taking manufacturing cost and the like into consideration. It is desirable for the thickness of the crystals to be small, taking the efficiency of thermal conveyance at the time of the thermal excitation into consideration, and a thickness of approximately 1 mm to 5 mm is practical for use. The crystals as those described above can be made commercially available relatively easily, and thus, the system may become widely used.

Next, units where conventional heating wires or sheathed heaters and cooling water or cooling gas refluxing units are combined are generally used as the temperature elevating and lowering stages, which are the main parts of the present invention, and heating and cooling units that utilize the Peltier elements are also effective. It is desirable, through the thermal excitation cycle caused by the above units, to repeat the operation where the temperature of, for example, a crystal plate, is elevated to an appropriate temperature, no higher than the Curie point (1200° C., in the case of $LiNbO_3$), for example, 200° C., during approximately 5 minutes to 10 minutes, and then, the temperature is lowered to approximately room temperature during the same period of time and again elevated to 200° C. In the case of the Peltier element, the energizing voltage and current is controlled by a program, and thereby, a thermal cycle having a predetermined period, as described above, can be simply provided. Here, optimal conditions for the above described upper limit temperature, lower limit temperature, and the period of time for one cycle are selected on the basis of the composition, size and the like of the crystal plates.

Next, the degree of vacuum of the low pressure gas housing that contains these crystal plates is sufficiently low at a pressure of approximately 3 Pa to 6 Pa, and a vacuum of which the level is higher than this is not necessary In the case where the ozone generation part is arranged outside of the x-ray generation housing 71, as shown in FIG. 9, the size of this housing may be slightly greater than the size of the crystal plates, and therefore, the size of the housing may be as small as a square of approximately 100 mm.

In addition, the crystal plates themselves are maintained at the grounding potential, and it is not necessary to apply any potential between a pair in the case where the pair are arranged so as to face each other, and therefore, it is completely unnecessary to provide high voltage equipment. Accordingly, the system can be easily installed in shops, hospitals, animal farms, restaurants, hotels and the like. Even in the case where Peltier effect elements are utilized in order to carry out thermal cycle excitation on crystal plates, it is, of course, not necessary to provide a large-scale power supply equipment.

Furthermore, the vessel of material gasses for generating ozone is usually utilized under a pressure in the vicinity of normal pressure, and therefore, may not be made of a very durable material, though it is desirable for it to be made of a chemically stable material, so that no impure molecules are generated as a result of x-ray stimulation or ozone reaction.

In addition, as described in the embodiments, the portion through which x-rays enter is usually made of an x-ray transmitting material, while it is also possible, as another embodiment, for the x-ray incident portion of the vessel to have the same functions as the x-ray target. In such a case, the entirety of the ozone vessel or the portion where the x-rays hit is formed of a thin copper film, an aluminum film or the like, so that the secondary x-rays which are emitted to the inside from this portion are made to contribute to the ozone reaction.

Figure 14:
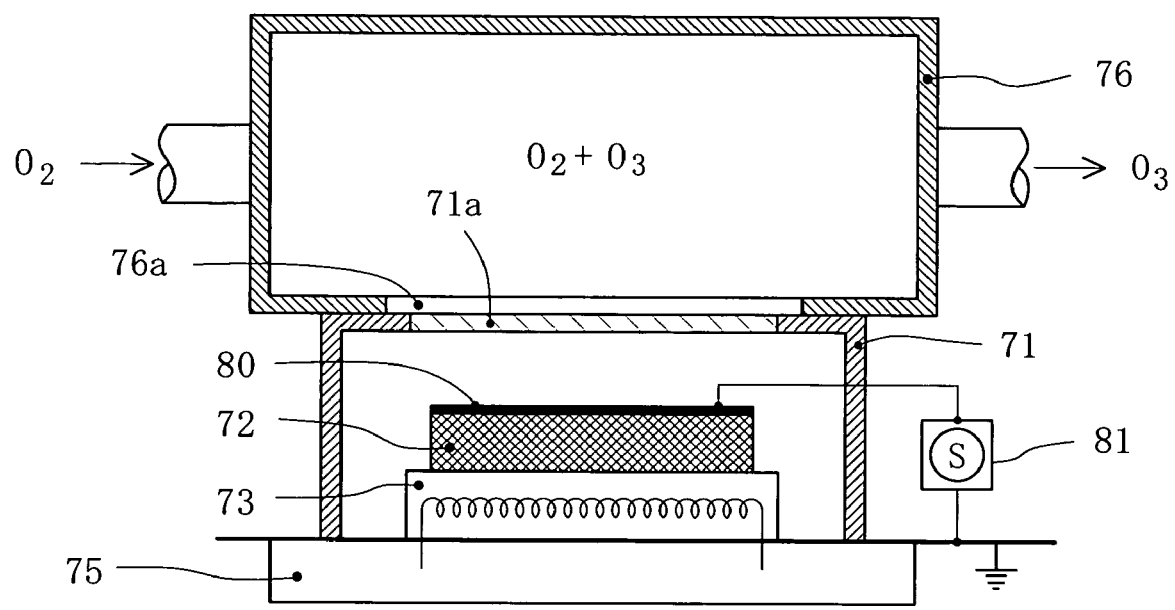
FIG. 14 is a diagram illustrating the principle of an embodiment where thermal cycle excitation and electrostriction cycle excitation, can be utilized on a hemimorphic crystal, in combination or switching between the two.

Though a system where the x-rays generated primarily through heat excitation of hemimorphic crystals are utilized for ozonization reaction is described above, it is also possible to excite the x-rays by electrically and physically stimulating hemimorphic crystals in accordance with a technique for x-ray excitation. FIG. 14 shows a system where a conductive film 80, such as niobium or tantalum, is made to adhere to the upper surface (surface having positive electricity) of a hemimorphic crystal 72 that is mounted within a vacuum (low pressure gas) housing, and an alternating voltage is applied between this film and the surface of the crystal having negative electricity (grounding side) by means of a control circuit 81, and thereby, periodic distortion is provided to the crystal itself, due to electrostriction, and the x-rays that are excited by the spontaneous polarization as a result of this distortion are utilized for the generation of ozone. The polarization inverting period of the alternating voltage for periodically supplying electrostriction is 60 cycles and the potential thereof is approximately 1 kV, and it is necessary to make almost no current flow. It is, of course, possible to provide periodic distortion to the crystal by means of other mechanisms or means for applying pressure. The ozone generating vessel, the x-ray target, the hollow cathode tube, the power supply controlling part and the like may be the same as those in the above described embodiments.

In the example of FIG. 14, the temperature elevating and lowering stage 73 and the above described electrostriction cycle exciting means 80 and 81 are used together so as to generate ozone more efficiently, and the two means may be driven simultaneously or alternately, or the ozone may be generated using only the x-rays from one of the two. In this case, the other means may be omitted.

A prototype of the above described ozone generator according to the present invention was fabricated and testing was carried out. As a result, it was confirmed that the ozone of a constant density was generated.

As described above, in accordance with an ozone generation method and unit according to the present invention, the soft x-rays are continuously generated from a planar surface or in three dimensions simply by repeatedly heating and cooling small a hemimorphic crystal in predetermined heat cycles, and ozonization is carried out using these x-rays radiating from a planar surface, and therefore, no power supply unit of a high voltage and high potential is required. The ozone generation method and unit can be easily utilized at home, in hospitals, stores, and kitchens, and in addition, the utilized x-rays are soft x-rays having low energy, which are immediately absorbed into the air so as to be eliminated, and so have no effect on the human body or the like, and do not cause any radiation damage.

In addition, as shown in the embodiments, more than one small hemimorphic crystal is combined so that the soft x-rays are intensively projected into an ozonization chamber, and thereby, the efficiency of ozonization can further be increased, and a large amount of ozone can be continuously generated.

Furthermore, an x-ray target made of a cathode-facing metal plate or a thin film as such of copper, aluminum, magnesium or vanadium is arranged between a hemimorphic crystal and an ozonization chamber, as shown in FIG. 10, so that the secondary x-rays (characteristic x-rays) gained by irradiating this target with the x-rays and charged particle beams that are generated through heat excitation of the hemimorphic crystal, as well as the white x-rays having continuous energy, can be projected into the ozonization chamber, and thereby, it becomes possible to selectively generate the characteristic x-rays having particular wavelengths that are optimal for ozonization, and thus, to accelerate efficient ozone reaction.

The present invention provides a unique idea that has not been seen so far in the prior art, where the ozone is generated using the x-rays (soft x-rays), and greatly contributes to the field relating to the conventional ozone generators.

INDUSTRIAL APPLICABILITY

According to the present invention, miniature hemimorphic crystals with power supplies of a small size, such as batteries, are used, so that a high electric field, such as one of several tens of kV/mm, is generated, and thereby, x-rays of which the intensity per area unit is significantly greater than that of electron gun systems can be continuously generated, unlike conventional large scale x-ray generators of inefficient electron gun systems. Therefore, according to the present invention, a compact x-ray generator which can rearrange the x-ray generators according to the prior art is provided, and this can be applied to an x-ray microscope, element analysis, crystal analysis or nondestructive inspection, or a variety of medical examinations.

In addition, according to the present invention, a necessary amount of ozone can be generated simply by repeatedly heating and cooling compact hemimorphic crystals in a predetermined heating cycle, without using an alternating high voltage power supply, unlike the conventional ozone generators. In addition, the utilized x-rays are soft x-rays having low energy, and are immediately absorbed and eliminated in the air, having no effects of radiation damage on the human body and the like. Therefore, according to the present invention, a compact ozone generator that operates with a power supply for general homes can be provided, and this can be applied to pasteurizing processes and sterilization for potable water, food, medical instruments and a variety of other daily necessities, in addition to air purification, deodorization, decolorization, disinfection, quality control and a variety of processes using ozone in hospitals, schools, animal farms and factories.

The invention claimed is:

1. An x-ray generator comprising:
   a vessel for holding a low pressure gas atmosphere inside;
   hemimorphic crystal supporting means provided in said vessel;

at least a pair of hemimorphic crystals supported by said hemimorphic crystal supporting means in said vessel and arranged oppositely to each other at a distance therebetween; and a heating and cooling means for elevating and lowering a temperature of said hemimorphic crystals, wherein x-rays are radiated from said vessel as the temperature of said hemimorphic crystals is elevated or lowered.

2. The x-ray generator according to claim 1, wherein said vessel has walls formed of a material for blocking the x-rays and provided with at least one x-ray transmission window.

3. The x-ray generator according to claim 1, wherein said hemimorphic crystals of each pair are arranged oppositely to each other at oppositely charged planes, and wherein said heating and cooling means elevates and lowers the temperature of said hemimorphic crystals of each pair with the same temperature gradients and with the same periods.

4. The x-ray generator according to claim 1, wherein said hemimorphic crystals of each pair are arranged oppositely to each other at oppositely charged planes, and a metal target is arranged between said hemimorphic crystals of each pair and is supported by a target supporting means in said vessel.

5. The x-ray generator according to claim 1, wherein said hemimorphic crystals of each pair are arranged oppositely to each other at planes having a charge of the same sign, and wherein said heating and cooling means elevates and lowers the temperature of said hemimorphic crystals of each pair with the same temperature gradients and with the same periods.

6. The x-ray generator according to claim 1, wherein said hemimorphic crystals of each pair are arranged oppositely to each other at planes having a charge of the same sign, and wherein said heating and cooling means elevates and lowers the temperature of said hemimorphic crystals of each pair with the opposite temperature gradients and with the same periods.

7. An x-ray generator comprising:
a vessel for holding a low pressure gas atmosphere inside;
hemimorphic crystal supporting means arranged in said vessel;
a pair of hemimorphic crystals supported by said hemimorphic crystal supporting means in said vessel and arranged oppositely to each other at a distance therebetween, said pair of hemimorphic crystals being arranged oppositely to each other at planes having a charge of the same sign;
a metal target surrounding a space between said pair of hemimorphic crystals in said vessel and supported by a target supporting means arranged in said vessel; and
a heating and cooling means for elevating and lowering a temperature of said hemimorphic crystals, wherein
x-rays are radiated from said vessel as the temperature of said hemimorphic crystals is elevated or lowered.

8. The x-ray generator according to claim 7, wherein said vessel has walls formed of a material that does not transmit the x-rays and is provided with at least one x-ray transmission window.

9. The x-ray generator according to claim 1, wherein said heating and cooling means has a temperature sensor for measuring the respective temperature of said hemimorphic crystals of each pair; a heating and cooling means for repeatedly heating and cooling said hemimorphic crystals; and a control means for controlling operation of said heating and cooling means based on a temperature detection signal from said temperature sensor.

10. An x-ray generator comprising:
a vessel for holding a low pressure gas atmosphere inside;
hemimorphic crystal supporting means arranged in said vessel;
a pair of hemimorphic crystal aggregates supported by said hemimorphic crystal supporting means in said vessel and arranged oppositely to each other at a distance therebetween;
a heating and cooling means for elevating and lowering a temperature of said hemimorphic crystal aggregates;
said pair of hemimorphic crystal aggregates being respectively composed of a number of hemimorphic crystals supported on a base and concavely curved, all of the hemimorphic crystals constituting one of said hemimorphic crystal aggregates facing positively charged planes toward a side apart from said base, all of the hemimorphic crystals constituting the other of said hemimorphic crystal aggregates facing negatively charged planes toward the side apart from said base, said pair of hemimorphic crystal aggregates being arranged oppositely to each other at a concave side apart from said base thereof; and
a metal target arranged between said pair of hemimorphic crystal aggregates and supported by a target supporting means in said vessel.

11. The x-ray generator according to claim 10, wherein said vessel has walls formed of a material for blocking x-ray transmission and provided with at least one slit-shaped x-ray transmission window positioned in a same plane, and wherein said base has a semi-cylindrical form, and wherein said hemimorphic crystals are arranged on the concave side of said base, and said pair of hemimorphic crystal aggregates are arranged oppositely to each other in said vessel in such a manner that a space between the aggregates in an axial direction matches said at least one slit-shaped x-ray transmission window.

12. An x-ray generator, comprising:
a vessel for holding a low pressure gas atmosphere inside, said vessel being formed of a material for blocking x-ray transmission;
hemimorphic crystal supporting means arranged in said vessel;
a pair of hemimorphic crystal aggregates arranged oppositely and joined to each other through a dielectric material, and supported by said hemimorphic crystal supporting means in said vessel;
a heating and cooling means for elevating and lowering a temperature of said hemimorphic crystal aggregates;
said pair of hemimorphic crystal aggregates being respectively composed of a number of hemimorphic crystals supported on a concave side of hemispherical shell-shaped bases, all of the hemimorphic crystals constituting one of the hemimorphic crystal aggregates facing positively charged planes toward a side apart from said base, all of the hemimorphic crystals constituting the other of said hemimorphic crystal aggregates facing negatively charged planes toward the side apart from said base, said pair of hemimorphic crystal aggregates being arranged oppositely to each other at the concave side apart from said base thereof and joined to each other through a ring-shaped dielectric material so as to form a spherical shell; and
a metal target supported by a target supporting means in said spherical shell at a position including a center of said spherical shell, at least one of said pair of hemimorphic crystal aggregates being provided with at least one through hole, a wall of said vessel being provided with an x-ray transmission window aligning with said at least one through hole.

13. An ozone generator, comprising:

a low pressure gas sealing housing;

a hemimorphic crystal arranged in said housing;

a hollow cathode arranged around the hemimorphic crystal;

a heating and cooling means for repeatedly heating and cooling said hemimorphic crystal arranged in said housing; and a vessel for a material gas for generating ozone, said vessel being arranged adjacently to an outside or inside of said housing, said vessel for the material gas for generating ozone being irradiated with soft x-rays generated from said hemimorphic crystal through an x-ray transmission window.

14. The ozone generator according to claim 13, wherein an x-ray target is arranged in the low pressure gas sealing housing, and wherein the soft x-rays and charged particle beams generated from the hemimorphic crystal are projected to said x-ray target, and thereby, said vessel for the material gas for generating ozone is irradiated with secondary x-rays generated from the target.

15. An ozone generator, comprising:

a low pressure gas sealing housing;

at least two hemimorphic crystals arranged oppositely to each other at a space therebetween in said housing;

a ring-shaped ozonization chamber arranged at a side of the space between said hemimorphic crystals opposed to each other;

a heating and cooling means provided to each of said hemimorphic crystals for repeatedly heating and cooling said hemimorphic crystals arranged in said housing the respective hemimorphic crystals being periodically and thermally excited in a same phase or in opposite phases; and a vessel for a material gas for generating ozone, said vessel being arranged adjacently to an outside or inside of said housing, said vessel for the material gas for generating ozone being irradiated with soft x-rays generated from said hemimorphic crystals through an x-ray transmission window.

16. An ozone generator, comprising:

a low pressure gas sealing housing;

a number of hemimorphic crystals arranged along an arched surface in said housing;

an ozonization chamber arranged at a center portion of said arched surface;

a heating and cooling means for repeatedly heating and cooling said hemimorphic crystals arranged in said housing; and a vessel for a material gas for generating ozone, said vessel being arranged adjacently to an outside or inside of said housing, said vessel for the material gas for generating ozone being irradiated with soft x-rays generated from said hemimorphic crystals through an x-ray transmission window.

17. An ozone generation method, comprising the steps of: arranging a number of hemimorphic crystals oppositely to each other in a low pressure gas sealing housing; and repeatedly thermally exciting said hemimorphic crystals in a cycle of a predetermined period of time, and controlling thermal excitation cycles of the respective crystals so as to be in a same phase or in opposite phases, thereby continuously generating soft x-rays from said hemimorphic crystals, and generating ozone by irradiating a material gas for generating ozone with the x-rays.

18. An ozone generation method, comprising the steps of: arranging and thermally exciting a number of hemimorphic crystals oppositely to each other in a sealed low pressure gas housing, and controlling thermal excitation cycles of the respective crystals so as to be in a same phase or in opposite phases, and thereby inducing an intensive electric field so as to generate and project charged particles and x-rays from said hemimorphic crystals to an x-ray target, and then, irradiating a material gas for generating ozone with secondary x-rays excited on said target, so as to generate ozone.

* * * * *